United States Patent
Mizutani

(10) Patent No.: US 7,612,354 B2
(45) Date of Patent: Nov. 3, 2009

(54) IMAGE READING APPARATUS AND DRIVE CONTROL METHOD THEREOF

(75) Inventor: Yasushi Mizutani, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 1030 days.

(21) Appl. No.: 10/508,368

(22) PCT Filed: Mar. 19, 2003

(86) PCT No.: PCT/JP03/33355

§ 371 (c)(1),
(2), (4) Date: Sep. 17, 2004

(87) PCT Pub. No.: WO03/079275

PCT Pub. Date: Sep. 25, 2003

(65) Prior Publication Data

US 2005/0141048 A1    Jun. 30, 2005

(30) Foreign Application Priority Data

Mar. 19, 2002 (JP) ............................. 2002-075811
Mar. 19, 2002 (JP) ............................. 2002-075937

(51) Int. Cl.
*G06K 5/00* (2006.01)
*G06K 11/00* (2006.01)

(52) U.S. Cl. .................... 250/556; 250/208.1; 382/124
(58) Field of Classification Search ............. 250/208.1, 250/556, 216; 358/474; 382/124
See application file for complete search history.

(56) References Cited

U.S. PATENT DOCUMENTS

| 6,259,108 | B1 * | 7/2001 | Antonelli et al. ............. 250/556 |
| 6,399,938 | B1 * | 6/2002 | Sugawara et al. ............ 250/556 |
| 6,668,071 | B1 * | 12/2003 | Minkin et al. ................ 382/124 |
| 6,670,595 | B1 * | 12/2003 | Sasaki et al. ............. 250/208.1 |
| 6,870,946 | B1 | 3/2005 | Teng et al. |
| 2002/0000915 | A1 | 1/2002 | Lee et al. |

FOREIGN PATENT DOCUMENTS

| CN | 1317761 A | 10/2001 |
| DE | 19731296 A1 | 7/1998 |
| EP | 1 139 271 A2 | 10/2001 |
| EP | 1187056 A2 | 3/2002 |
| JP | 2001-298174 | 10/2001 |
| JP | 2001-332716 | 11/2001 |
| TW | 476047 | 2/2002 |
| WO | WO 00/08591 | 2/2000 |

* cited by examiner

*Primary Examiner*—Seung C Sohn
(74) *Attorney, Agent, or Firm*—Frishauf, Holtz, Goodman & Chick, P.C.

(57) ABSTRACT

There is provided an image reading apparatus which reads an image pattern of a medium placed on a detection surface of a sensor array (100). In a waiting state, electrical connection between the sensor array (100) and a drive controller (110, 120) is cut off, and whether a medium is placed on the detection surface or not is detected. When a medium is placed on the detection surface, the sensor array (100) and the drive controller (110, 120) are electrically connected and an image reading operation is started. In a case where the medium is separated from the detection surface during the image reading operation, the image reading operation is suspended and the image reading apparatus is set to the waiting state.

31 Claims, 19 Drawing Sheets

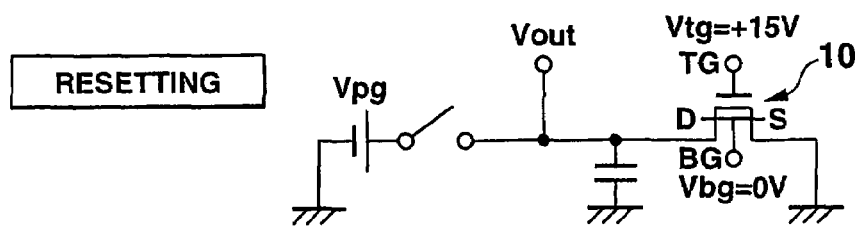
FIG.3A RESETTING
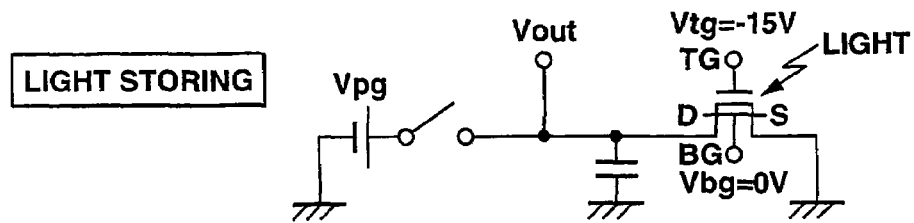
FIG.3B LIGHT STORING
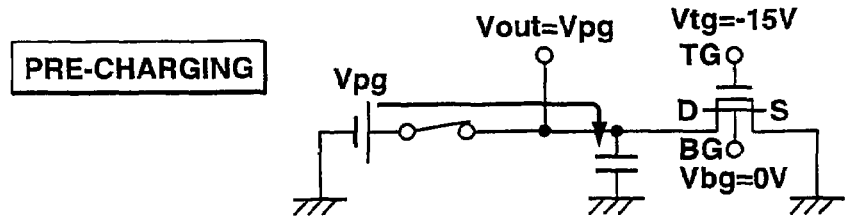
FIG.3C PRE-CHARGING
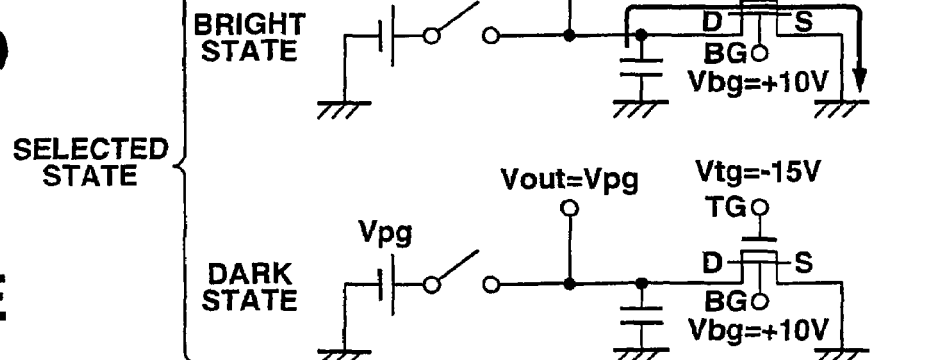
FIG.3D READING — SELECTED STATE, BRIGHT STATE
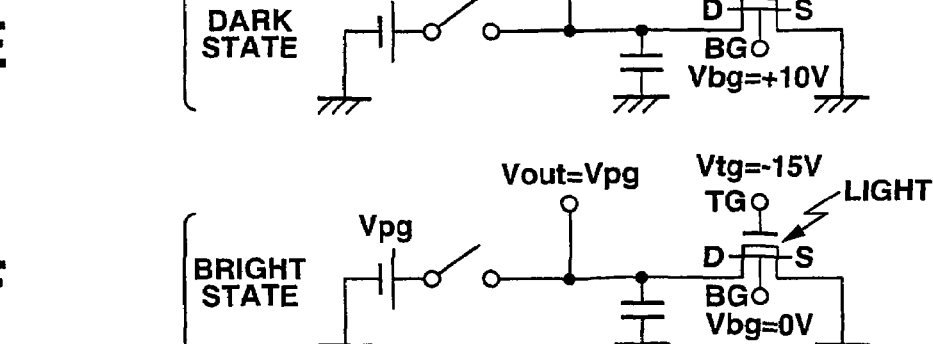
FIG.3E SELECTED STATE, DARK STATE
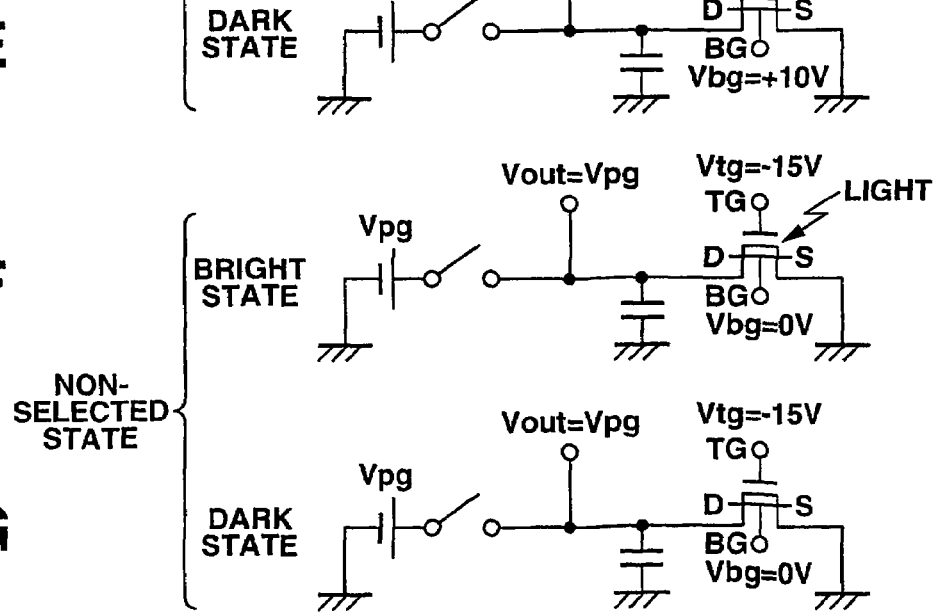
FIG.3F NON-SELECTED STATE, BRIGHT STATE
FIG.3G NON-SELECTED STATE, DARK STATE

IMAGE READING APPARATUS AND DRIVE CONTROL METHOD THEREOF

This application is a U.S. National Phase Application under 35 USC 371 of International Application PCT/JP03/03355 filed Mar. 19, 2003.

TECHNICAL FIELD

The present invention relates to an image reading apparatus. Particularly, the present invention relates to an image reading apparatus which has a sensor array formed of a plurality of sensors on which a medium having an image pattern is placed so that it contacts the array, and reads the image pattern of the medium by driving the sensor array to perform scanning.

BACKGROUND ART

Conventionally, as a technique for reading two-dimensional image patterns such as printings, photographs, or fingerprints or other patterns having slight height, there has been known an image reading apparatus which has a sensor array formed of opto-electric conversion elements arranged in matrix or in line, and by driving the sensor array to perform scanning, reads an image pattern of a medium which is placed in contact with a detection surface provided on the sensor array.

Such an image reading apparatus is now being greatly researched and developed in order to apply this technique to a so-called biometric authentication technique for identifying an individual by checking information such as a fingerprint specific to a biological body, since there has recently been a social demand for securities in management and protection of personal and corporate information or in crime prevention.

In a case where such an image reading apparatus is applied to a fingerprint reading apparatus or the like, one such apparatus starts the image reading operation when it is detected, as a motive to start the image reading operation, that a medium such as a finger is placed on a detection surface of its sensor array.

This type of image reading apparatus having a function for detecting placement of a medium generally comprises, as shown in FIG. 18, a sensor array $100p$ formed of a plurality of sensors $10p$ arranged in matrix, a medium detector $30p$ provided on the sensor array $100p$, a detection circuit $40p$ for outputting a control signal upon detection of placement of a finger (medium) FG thereby to start the image reading operation, and a drive circuit $50p$ for driving the sensor array $100p$ when receiving the control signal.

However, this image reading apparatus has the following problems.

That is, in order to detect whether a medium is placed or not, the medium detector $30p$ and the detection circuit $40p$ are always put in an operated state. And a predetermined bias voltage is always applied to the sensor array $100p$ even while the image reading operation is not performed. As a result, the bias voltage is applied to the sensors $10p$ for a long time and the sensing property of the sensors $10p$ is gradually worn out.

Further, one end of the sensor array $100p$ is always grounded. Because of this, in a case where a medium is charged with static electricity, part of the static electricity might be discharged to the ground potential through the sensor array $100p$. This might damage the sensors $10p$ and the drive circuit $50p$, or cause malfunctioning.

Still further, according to this image reading apparatus, the image reading operation is started upon detection that a medium is placed, as described above. Once the image reading operation is started, the sensor array $100p$ continues to be driven at least until reading of the full image data is completed by this operation. Therefore, even in a case where the medium loses contact with the sensors $10p$ due to some cause in the middle of the image reading operation, the image reading operation is continuously performed, resulting in obtaining incomplete image data. This costs a fruitless operation and a time required therefor.

Yet further, let it be assumed that the image reading apparatus is used outdoors or in an environment where external light intensity is quite high. And let it be assumed that in this environment, the image reading operation is started with a finger (medium) FG placed on a detection surface $100s$ as shown in FIG. 19A, and after this, the finger (medium) FG is separated from the detection surface $100s$ as shown in FIG. 19B. In this case, if the image reading operation is continued as described above and if the sensors $10p$ are photo-sensors, the sensors $10p$ receive the external light having high intensity while they are driven. Due to this, an excess current flows through the sensors $10p$, and the property of the sensors $10p$ might be greatly deteriorated.

DISCLOSURE OF INVENTION

The present invention relates to an image reading apparatus for reading an image of a medium placed on a detection surface formed by arranging a plurality of sensors, and has an advantage that reliability of the image reading apparatus can be improved and usage convenience of the image reading apparatus can be improved by overcoming problems: that the characteristic of the sensors is deteriorated due to long-time application of a bias voltage to the sensors; and that even if the medium is separated from the detection surface during an image reading operation, the image reading operation is continued, resulting in obtaining incomplete image data and costing a wasteful operation and time.

To achieve the above-described advantage, an image reading apparatus according to the present invention comprises: a sensor array which is formed by arranging a plurality of sensors, and has a detection surface on which a medium is placed; a drive controller which performs an image reading operation of supplying a predetermined drive control signal to each sensor of the sensor array, and reading an image pattern of the medium placed on the detection surface; a medium detector which detects a placement state where the medium is placed on the detection surface; a connection switching controller which controls electrical connection between the sensor array and the drive controller, at least in accordance with a detection result of the placement state of the medium by the medium detector; and an operation controller which controls an operational state of the drive controller, at least in accordance with a detection result of the placement state of the medium by the medium detector. The connection switching controller includes a switching unit which is provided between the sensor array and the drive controller. The connection switching controller controls to cut off electrical connection between at least the sensor array and the drive controller in a waiting state, controls to electrically connect the sensor array and the drive controller in a case where the medium detector detects that the medium is placed on the detection surface, and controls to cut off electrical connection between the sensor array and the drive controller in a case where the medium detector detects that the medium is separated from the detection surface or in a case where reading of the image pattern of the medium is completed by the image reading operation by the drive controller.

The medium detector includes for example: an electrode layer which is provided on the detection surface; and a capacitance change detector which detects a change in a capacitance of the electrode layer. The medium detector supplies the switching unit with a switching control signal for controlling the switching unit in accordance with a detection result of the placement state of the medium, supplies the switching unit with a switching control signal for electrically connecting the sensor array and the drive controller, in a case where it detects that the medium is placed on the detection surface, and supplies the switching unit with a switching control signal for cutting off electrical connection between the sensor array and the drive controller, in a case where it detects that the medium is separated from the detection surface.

The operation controller controls the drive controller to start the image reading operation when the medium detector detects that the medium is placed on the detection surface, and controls the drive controller to suspend the image reading operation and sets the drive controller to a waiting state by cutting off supply of a drive voltage to at least the drive controller when the medium detector detects that the medium is separated from the detection surface while the image reading operation is performed by the drive controller.

The image reading apparatus comprises a warning unit which includes at least one of a display unit and a sound unit, and notifies information on an operational state of the image reading apparatus to outside, and the operation controller performs a predetermined warning operation using the warning unit, in a case where the medium detector detects that the medium is separated from the detection surface while the image reading operation by the drive controller is performed.

To achieve the above-described advantage, a drive control method for the image reading apparatus according to the present invention comprises: a step of cutting off electrical connection between the sensor array and the drive controller and setting the image reading apparatus to a waiting state; a step of detecting a placement state where the medium is placed on the detection surface of the sensor array; and a step of electrically connecting the sensor array and the drive controller, when it is detected that the medium is placed on the detection surface. The drive control method for the image reading apparatus according to the present invention further comprises: a step of cutting off electrical connection between the sensor array and the drive controller when it is detected that the medium is separated from the detection surface; a step of starting an image reading operation for reading the image pattern of the medium when it is detected that the medium is placed on the detection surface; and a step of suspending the image reading operation when it is detected that the medium is separated from the detection surface while the image reading operation is performed.

BRIEF DESCRIPTION OF DRAWINGS

These objects and other objects and advantages of the present invention will become more apparent upon reading of the following detailed description and the accompanying drawings in which:

FIG. 3A to FIG. 3G are diagrams showing an operational concept of a double-gate photo-sensor;

BEST MODE FOR CARRYING OUT THE INVENTION

Figure 1A:
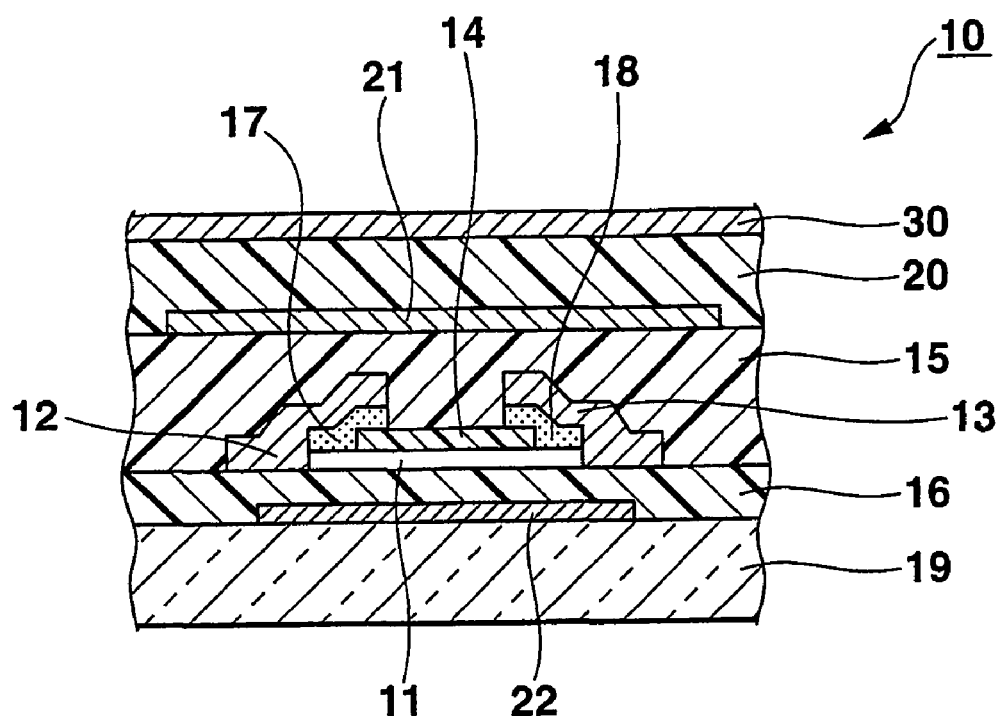
FIG. 1A is a cross sectional view showing a structure of a double-gate photo-sensor.

The image reading apparatus and drive control method of the present invention will now be explained according to the embodiments shown in the drawings.

First, a structure of a sensor which is suitable for the image reading apparatus of the present invention will be explained. As a sensor applicable to the image reading apparatus of the present invention, a solid state image sensor such as a CCD (Charge Coupled Device) can be used.

As widely known, a CCD has a structure formed of a matrix of photo-sensors such as photodiodes and thin film transistors (TFTs). The CCD detects the intensity of light irradiated thereto by detecting the amount of pairs of electron-positive hole (charge amount) generated in accordance with the amount of light irradiated to the light receiving section of each photo-sensor using a horizontal scanning circuit and a vertical scanning circuit.

According to the image reading apparatus using such a CCD, each photo-sensor must individually be provided with a selection transistor for putting the photo-sensor in a selected state when the photo-sensor is scanned. Therefore, there is a problem that as the number of detected pixels increases, the system itself gets larger-sized.

In order to overcome this problem, a thin film transistor having a so-called double-gate structure (hereinafter, referred to as "double-gate transistor") has been developed recently. This double-gate transistor has both the photo-sensing function of a photo-sensor, and the function as a selection transistor. With this double-gate transistor, attempts to make the system smaller and to make the density of pixels higher (or to make the system able to read a more precise image) have been made. This double-gate transistor can be applied to the image reading apparatus of the present invention.

Now, a photo-sensor constituted by a double-gate transistor applicable to the image reading apparatus of the present invention (hereinafter referred to as "double-gate photo-sensor") will be explained with reference to the drawings.

<Double-Gate Photo-Sensor>

Figure 1B:
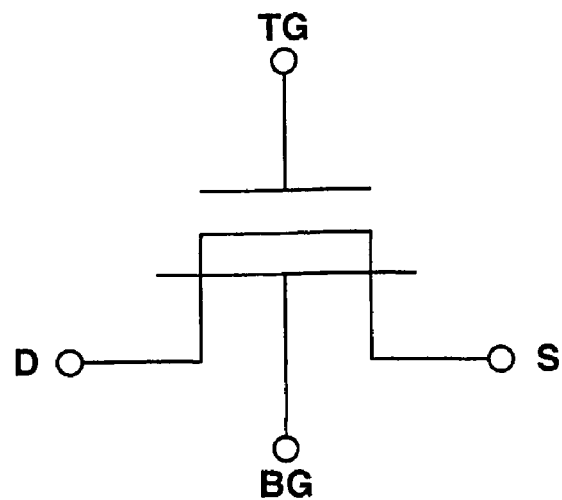
FIG. 1B is a diagram showing an equivalent circuit of a double-gate photo-sensor.

FIG. 1A and FIG. 1B are cross sections showing schematic structures of the double-gate photo-sensor.

As shown in FIG. 1A, the double-gate photo-sensor 10 comprises a semiconductor layer (channel layer) 11, impurity layers 17 and 18, a drain electrode 12, a source electrode 13, a block insulation film 14, a top gate insulation film 15, a bottom gate insulation film 16, a top gate electrode (first gate electrode) 21, and a bottom gate electrode (second gate electrode) 22. The semiconductor layer 11 is made of amorphous silicon or the like which produces electron-positive hole pairs when an excited light (a visible light in here) is irradiated. The impurity layers 17 and 18 are made of n$^+$ silicon and provided on both ends of the semiconductor layer 11, respectively. The drain electrode 12 and the source electrode 13 are made of any of chromium, chromium alloy, aluminum, aluminum alloy, etc., formed on the impurity layers 17 and 18 respectively, and opaque against a visible light. The top gate electrode 21 is made of a transparent electrode layer such as a tin oxide (SnO$_2$) film, an ITO (Indium-Tin-Oxide) film, etc., formed above the semiconductor layer 11 (the upper side of the drawing) via the block insulation film 14 and the top gate insulation film 15, and shows transmissivity toward a visible light. The bottom gate electrode 22 is made of any of chromium, chromium alloy, aluminum, aluminum alloy, etc., formed below the semiconductor layer 11 (the lower side of the drawing) via the bottom gate insulation film 16, and opaque against a visible light. The double-gate photo-sensor 10 having this structure is formed on a transparent insulation substrate 19 such as a glass substrate.

In FIG. 1A, each of the top gate insulation film 15, the block insulation film 14, the bottom gate insulation film 16, a protection insulation film 20 provided upon the top gate electrode 21, and a transparent electrode layer 30 at the topmost level is made of a material such as silicon nitride, silicon oxide, ITO, etc., which has a high transmissivity toward a visible light which excites the semiconductor layer 11. Due to this, the double-gate photo-sensor 10 detects only a light coming from the upper side of the drawing.

Such a double-gate photo-sensor 10 is generally represented by an equivalent circuit shown in FIG. 1B. In FIG. 1B, TG denotes a top gate terminal electrically connected to the top gate electrode 21, BG denotes a bottom gate terminal electrically connected to the bottom gate electrode 22, S denotes a source terminal electrically connected to the source electrode 13, and D denotes a drain terminal electrically connected to the drain electrode 12.

Next, a drive control method for the above-described double-gate photo-sensor will be explained with reference to the drawings.

Figure 2:
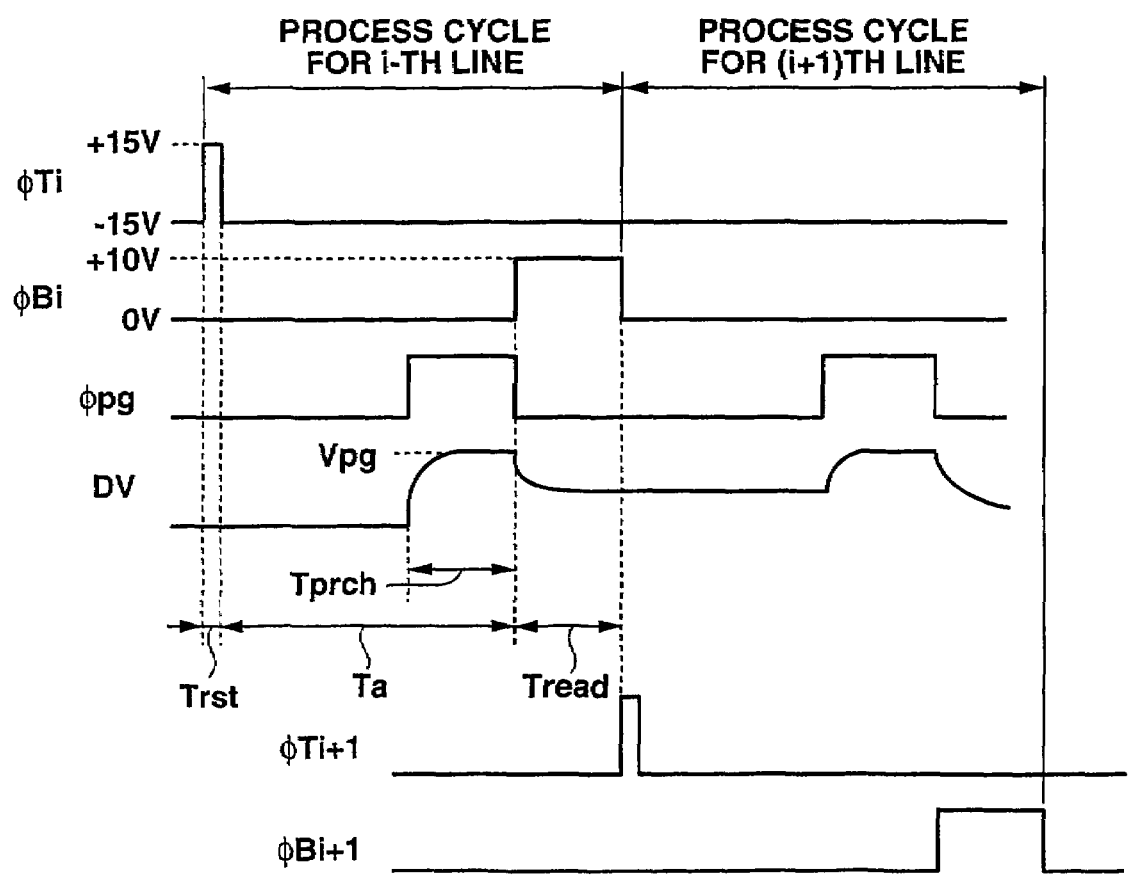
FIG. 2 is a timing chart showing an example of a basic drive control method for a double-gate photo-sensor.
Figure 4A:
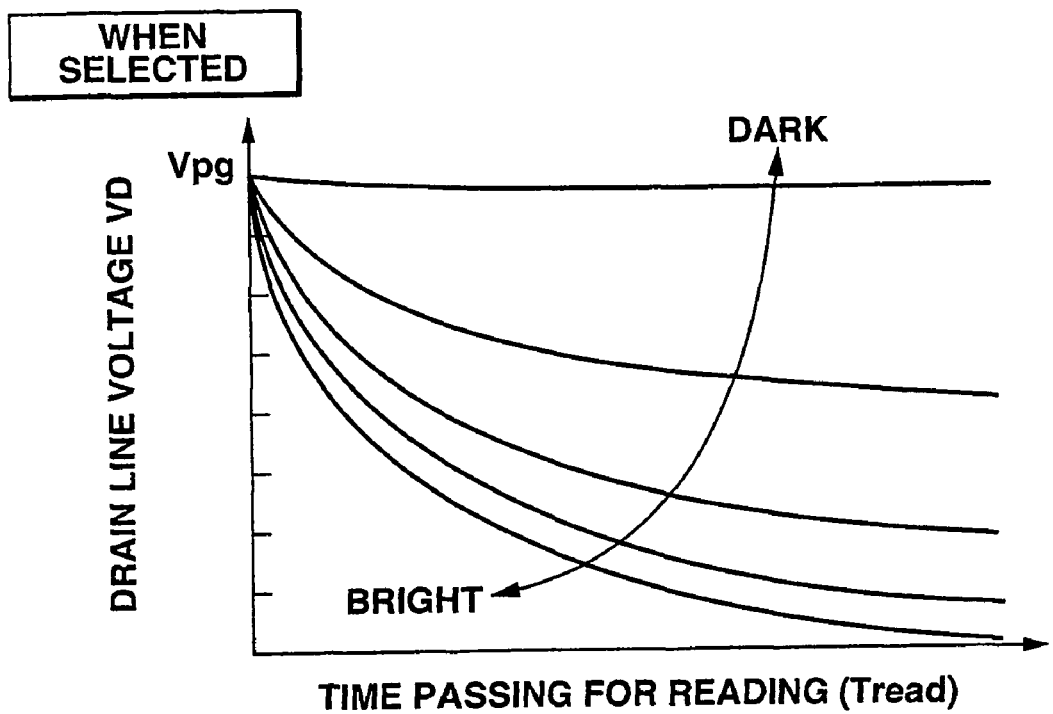
FIG. 4A and FIG. 4B are diagrams showing optical response characteristics of an output voltage of a double-gate photo-sensor.
Figure 4B:
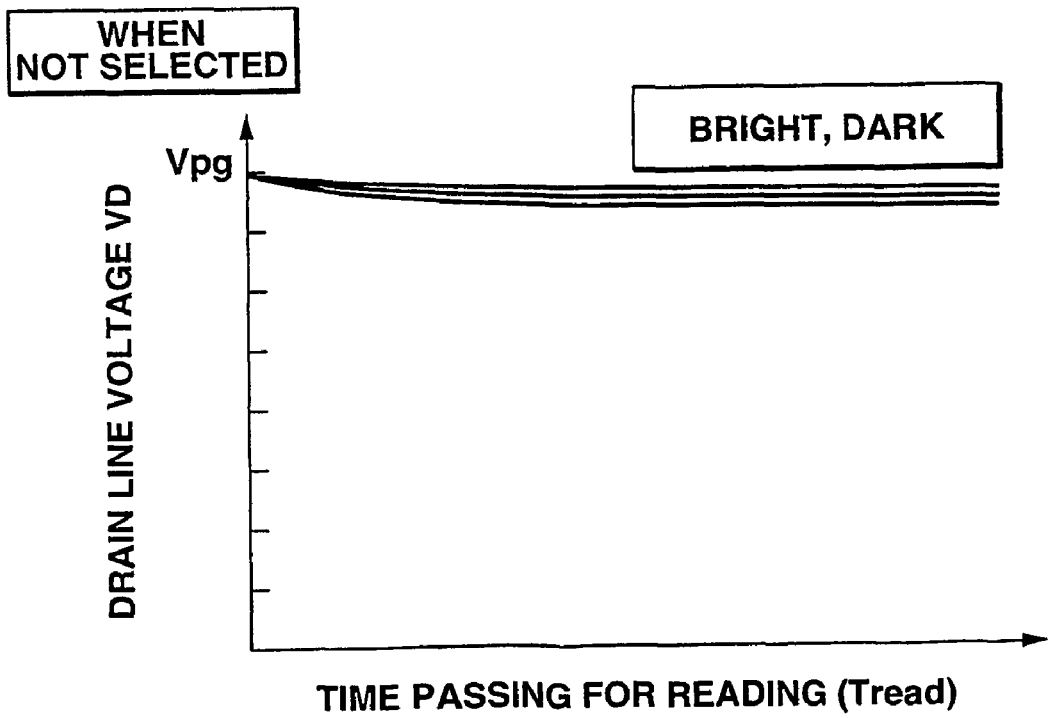

FIG. 2 is a timing chart showing one example of a basic drive control method for the double-gate photo sensor. FIG. 3A to FIG. 3G are diagrams for explaining the concept of the operation of the double-gate photo-sensor. FIG. 4A and FIG. 4B are diagrams showing optical response characteristics of an output voltage of the double-gate photo-sensor. Explanation will be made below by timely referring to the above-described structure of the double-gate photo-sensor (FIG. 1).

In a reset operation (initializing operation), a pulse voltage (hereinafter referred to as "reset pulse"; at a high level of Vtg=+15V for example) φTi is applied to the top gate terminal TG of the double-gate photo-sensor 10 as shown in FIG. 2A and FIG. 3A, in order to discharge carriers (positive holes in here) stored in the semiconductor layer 11 and around the interface between the block insulation film 14 and the semiconductor layer 11 (reset period Trst).

Then, in a light storing operation (charge storing operation), a bias voltage φTi of a low level (for example, Vtg=−15V) is applied to the top gate terminal TG as shown in FIG. 2 and FIG. 3B, thereby the reset operation is ended and a light storing period Ta for a carrier storing operation is started. During the light storing period Ta, in accordance with the amount of an incident light coming from the side of the top gate electrode 21, electron-positive hole pairs are generated in an incident-light-effective area, i.e., a carrier generation area of the semiconductor layer 11. Thus, positive holes are stored in the semiconductor layer 11 and around the interface between the block insulation film 14 and the semiconductor layer 11, that is, around a channel area.

In a pre-charging operation, as shown in FIG. 2 and FIG. 3C, a predetermined voltage (pre-charge voltage) Vpg is applied to the drain terminal D in accordance with a pre-charge signal φpg in parallel with the light storing period Ta, so that the drain electrode 12 is charged (pre-charge period Tprch).

Then, in a reading operation, a bias voltage (a reading selection signal; hereinafter referred to as "reading pulse") φBi of a high level (Vbg=+10V for example) is applied to the bottom gate terminal BG (a selected state), after the pre-charge period Tprch lapses, as shown in FIG. 2 and FIG. 3D. In response to this application of the bias voltage, the double-gate photo-sensor 10 is turned ON (reading period Tread).

During the reading period Tread, the carriers (positive holes) stored in the channel area work in a direction in which the voltage Vtg (−15V) having a reverse polarity and applied to the top gate terminal TG is weaken. Therefore, an n channel is formed by the voltage Vbg (+10V) applied to the bottom gate terminal BG. And as shown in FIG. 4A, the voltage (drain voltage) VD of the drain terminal D shows a tendency to gradually decrease from the pre-charge voltage Vpg as the time passes, in accordance with a drain current.

That is, as shown in FIG. 3D, in a case where the light storing state during the light storing period Ta is in a bright state, carriers (positive holes) corresponding to the amount of the incident light are captured in the channel area. Those carriers work to cancel the negative bias applied to the top gate terminal TG. The double-gate photo-sensor 10 is turned ON by the positive bias applied to the bottom gate terminal BG in accordance with the canceled amount. And the drain voltage VD decreases in accordance with the ON resistance which corresponds to the amount of the incident light, as shown in FIG. 4A.

On the other hand, as shown in FIG. 3E, in a case where the light storing state is in a dark state where carriers (positive holes) are not stored in the channel area, the positive bias of the bottom gate terminal BG is canceled by applying a negative bias to the top gate terminal TG. Thus, the double-gate photo-sensor 10 is turned OFF, and the drain voltage VD is kept almost as it has been as shown in FIG. 4A.

Accordingly, as shown in FIG. 4A, the drain voltage VD's tendency to change is greatly related to the amount of a light received during a time period (light storing period Ta) from the end of the reset operation of applying the reset pulse $\phi$Ti to the top gate terminal TG to the application of the reading pulse $\phi$Bi to the bottom gate terminal BG. If the amount of stored carriers is large (bright state), the drain voltage VD decreases steeply. If the amount of stored carriers is small (dark state), the drain voltage VD decreases gently. Due to this characteristics, it is possible to calculate the amount of an incident light (irradiated light) coming to the double-gate photo-sensor 10, by detecting the drain voltage VD (=Vrd) when a predetermined time has passed after the reading period Tread started, or by detecting a time period required for the pre-charge voltage Vpg to reach a predetermined threshold voltage set as a reference.

The above described series of image reading operations is performed in one cycle. By repeating this series of operations also for the double-gate photo-sensor 10 in an (i+1)th line, the double-gate photo-sensors can be operated as a two-dimensional sensor system.

If a state (non-selected state) where a voltage of a low level (for example, Vbg=0V) is applied to the bottom gate terminal BG as shown in FIGS. 3F and 3G is continued after the pre-charge period Tprch has passed in the timing chart shown in FIG. 2, the double-gate photo-sensor 10 continues to be turned OFF. And the drain voltage VD is kept at levels close to the level of the pre-charge voltage Vpg, as shown in FIG. 4B. In accordance with what kind of voltage is applied to the bottom gate terminal BG, it is possible to achieve a selection function for switching the reading state of the double-gate photo-sensor 10 between the selected state and the non-selected state.

<Photo-Sensor System>

Next, an image reading apparatus having a photo-sensor array formed by arranging the above-explained double-gate photo-sensors in a predetermined method, will now be explained with reference to the drawings. Here, a photo-sensor array formed by arranging a plurality of double-gate photo-sensors in two dimension will be explained. However, needless to say, it is possible to employ a line sensor array formed by one-dimensionally arranging a plurality of double-gate photo sensors in an X direction, so that a two-dimensional area can be scanned by moving the line sensor array in a Y direction orthogonal to the X direction.

Figure 5:
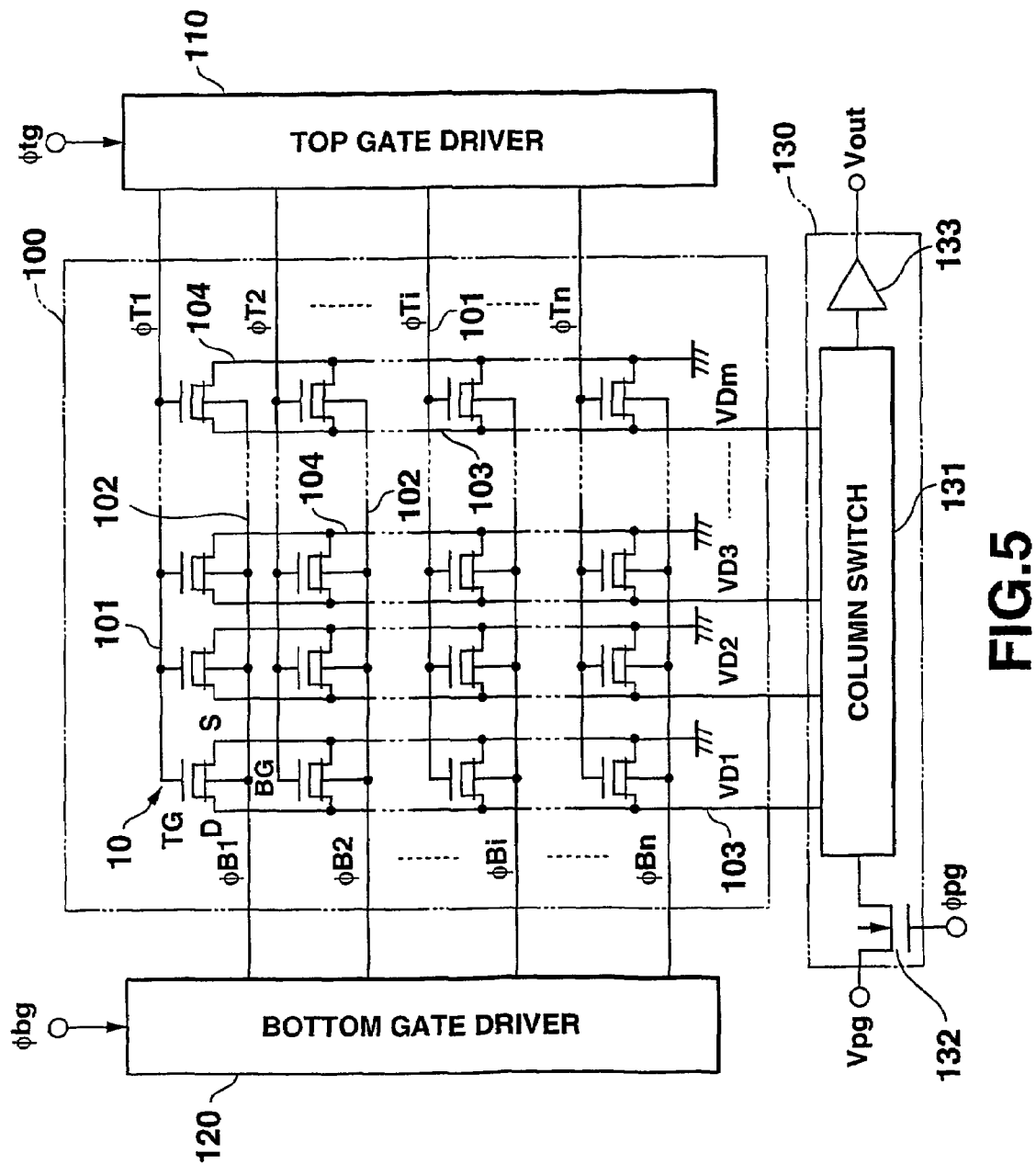
FIG. 5 is a diagram showing a schematic structure of a photo-sensor system comprising a photo-sensor array formed by arranging double-gate photo-sensors in two dimension.

FIG. 5 is a diagram showing a schematic structure of a photo-sensor system having a photo-sensor array formed by arranging double-gate photo-sensors in two dimension.

As shown in FIG. 5, the photo-sensor system comprises a photo-sensor array 100, top gate lines 101, bottom gate lines 102, drain lines (data lines) 103, source lines (common lines) 104, a top gate driver 110, a bottom gate driver 120, and a drain driver 130. The photo-sensor array 100 is formed by arranging a plurality of double-gate photo-sensors 10 in a matrix of n-lines×m-columns (n and m are arbitrary natural numbers). Each top gate line 101 is a line that extends by connecting the top gate terminals TG (top gate electrode 21) of the double-gate photo-sensors 10 in the line direction. Each bottom gate line 102 is a line that extends by connecting the bottom gate terminals BG (bottom gate electrode 22) of the double-gate photo-sensors 10 in the line direction. Each drain line 103 is a line that connects the drain terminals D (drain electrode 12) of the double-gate photo-sensors 10 in the column direction. Each source line 104 is a line that connects the source terminals S (source electrode 13) of the double-gate photo-sensors 10 in the column direction, and is connected to a ground potential. The top gate driver 110 is connected to the top gate lines 101. The bottom gate driver 120 is connected to the bottom gate lines 102. The drain driver 130 is connected to the drain lines 103, and includes a column switch 131, a pre-charge switch 132, and an amp 133.

Each top gate line 101 is made of a transparent electrode layer such as ITO, together with the top gate electrode 21 shown in FIG. 1. Each bottom gate line 102, each drain line 103, and each source line 104 are made of a material opaque against an excited light, together with the bottom gate electrode 22, the drain electrode 12, and the source electrode 13, respectively. A later-described constant voltage Vss which is set in accordance with the pre-charge voltage Vpg is applied to the source lines 104. However, the source lines 104 may be set at a ground potential (GND).

In FIG. 5, $\phi$tg represents a control signal for generating signals $\phi$T1, $\phi$T2, . . . $\phi$Ti, . . . $\phi$Tn which are to be output as either a reset voltage or a light carrier storing voltage selectively. $\phi$bg represents a control signal for generating signals $\phi$B1, $\phi$B2, . . . $\phi$Bi, . . . $\phi$Bn which are to be output as either a reading voltage or a non-reading voltage selectively. $\phi$pg represents a pre-charge signal for controlling the timing to apply the pre-charge voltage Vpg. It should be noted that in each double-gate photo-sensor 10 shown in FIG. 5, the terms "drain" and "source" are fixedly used for the terminal at the drain side and the terminal at the source side respectively for convenience' sake. However, needless to say, the function of each terminal is switched in accordance with operational states of the image reading apparatus (double-gate photo-sensor 10).

In this structure, the photo-sensing function is realized by applying a signal $\phi$Ti (i is an arbitrary natural number; i=1, 2, . . . n) output from the top gate driver 110 to the top gate terminal TG through the top gate line 101. The selective reading function is realized by applying a signal $\phi$Bi from the bottom gate driver 120 to the bottom gate terminal BG through the bottom gate line 102, taking in a detection signal into the drain driver 130 through the drain line 103, and by outputting it as an output voltage Vout of serial data or parallel data.

Figure 6:
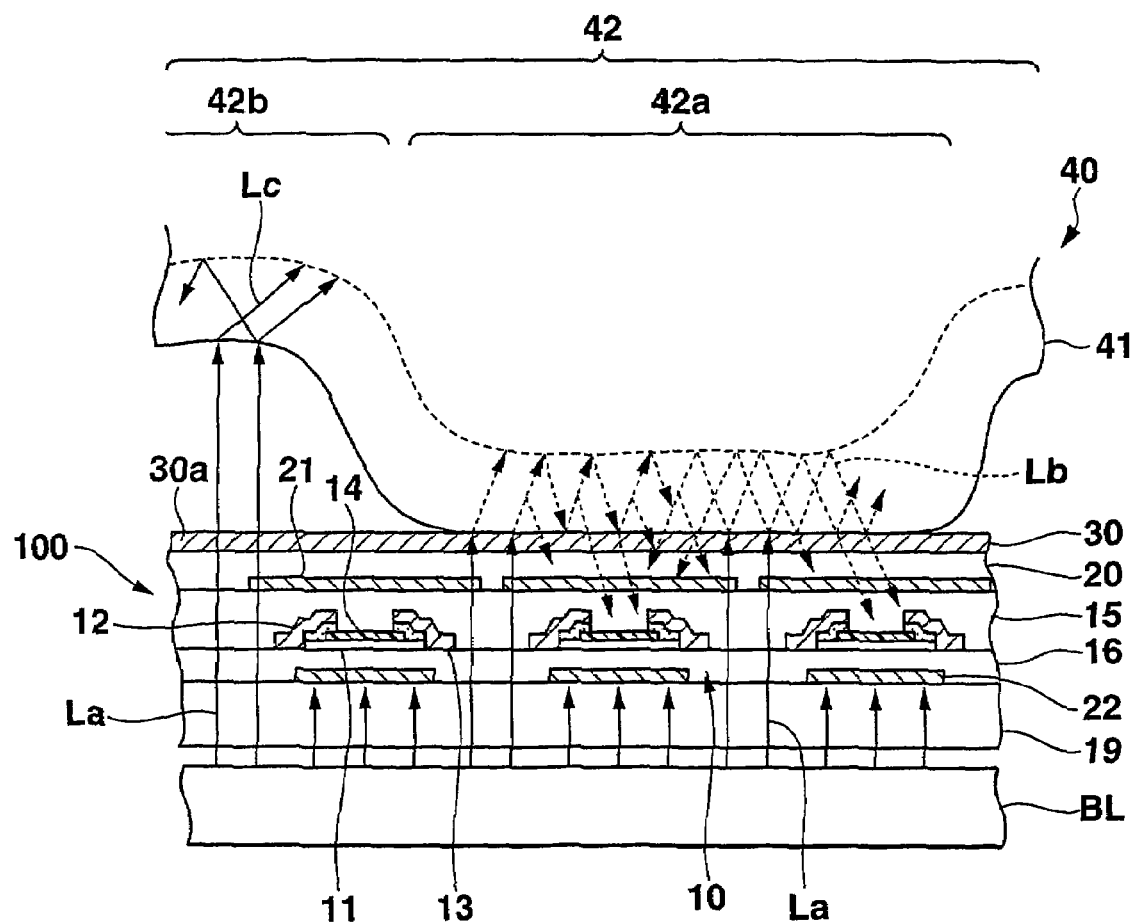
FIG. 6 is a cross sectional view showing a principal part of an image reading apparatus to which a photo-sensor system comprising a photo-sensor array formed by arranging double-gate photo-sensors in two dimension is applied.

FIG. 6 is a cross section showing a principal part of the image reading apparatus (fingerprint reading apparatus) to which the above-described photo-sensor system is applied. In FIG. 6, hatching for representing cross-sectioned parts of the photo-sensor system is omitted for the sake of explanation and illustration.

As shown in FIG. 6, in the image reading apparatus for reading image patterns such as fingerprints, irradiation light La is irradiated from a backlight (plane light source) BL provided under the insulation substrate 19 such as a glass substrate on which the double-gate photo-sensors 10 are formed. This irradiation light La travels through the transparent insulation substrate 19 and the insulation films 15, 16, and 20 except the areas on which the double-gate photo-sensors 10 (specifically, the bottom gate electrodes 22, the drain electrodes 12, and the source electrodes 13) are formed, to be irradiated to a finger (medium) 40 which is placed on a detection surface (fingerprint detection surface) 30a upon the transparent electrode layer 30.

In a fingerprint reading operation by the fingerprint reading apparatus, when a semi-transparent layer at a skin surface layer 41 of the finger 40 touches the transparent electrode layer 30 formed on the topmost level of the photo-sensor array 100, an air layer having a low refraction ratio vanishes from the interface between the transparent electrode layer 30 and the skin surface layer 41. The thickness of the skin surface layer 41 is thicker than 650 nm. Thus, the irradiation light La coming into the inside of a projecting portion 42a of a fingerprint 42 conducts through the skin surface layer 41 while being scattered and reflected. Part of the conducting light La travels through the transparent electrode layer 30, and the transparent insulation films 20, 15, and 14, and the top gate electrodes 21, and comes to the semiconductor layers 11 of the double-gate photo-sensors 10, as an excited light. Carriers (positive holes), which are generated when the light comes to the semiconductor layers 11 of the double-gate photo-sensors 10 arranged in positions corresponding to the projecting portion 42a of the finger 40, are stored. Thereby, the image pattern of the finger 40 can be read as bright/dark information in accordance with the above-explained series of drive control method.

At a depressed portion 42b of the fingerprint 42, the irradiation light La passes through the interface between the detection surface 30a of the transparent electrode layer 30 and the air layer and reaches the finger 40 beyond the air layer to be scattered in the skin surface layer 41. Since the skin surface layer 41 has a higher fraction ratio than that of the air, a light Lc which crosses the interface between the air layer and the skin surface layer 41 at a certain angle and comes into the skin surface layer 41 does not easily escape into the air layer. This prevents the light from coming to the semiconductor layer 11 of the double-gate photo-sensor 10 which is arranged at a position corresponding to the depressed portion 42b.

As described above, by using a transparent conductive material such as ITO as the transparent electrode layer 30, the light irradiated to the finger 40 placed on the transparent electrode layer 30 is scattered and reflected to come to the semiconductor layer 11 of each double-gate photo-sensor 10 desirably. Therefore, reading of the image pattern (fingerprint) of the medium is performed preferably without deterioration of the reading sensitivity in the operation of reading the finger (medium) 40.

<Medium Detection Method>

Next, an example of a medium detection method of detecting a placement state of a medium, which is applicable to the image reading apparatus of the present invention will be explained with reference to the drawings.

As the medium detection method, a capacitance detection method, a resistance detection method, various other methods can be employed, as will be explained below.

Figure 7A:
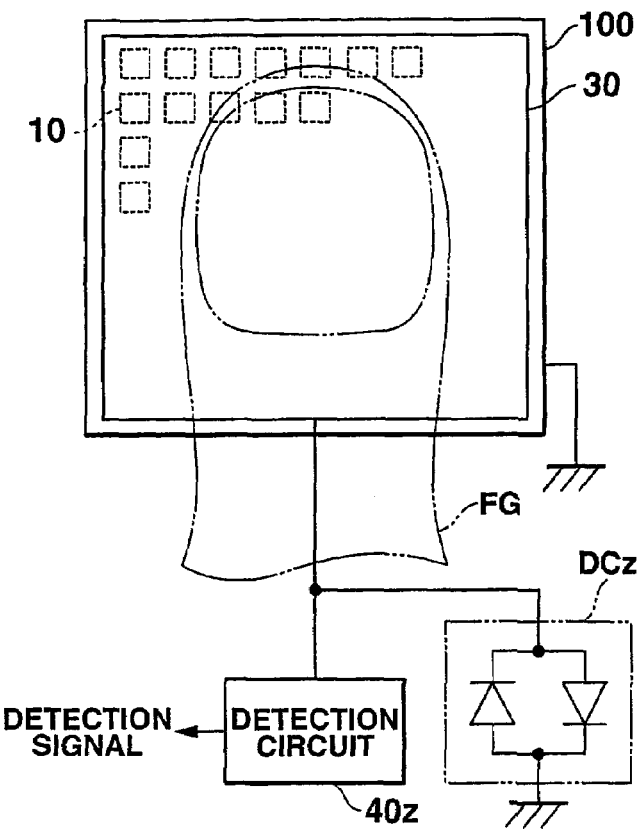
FIG. 7A is a schematic diagram showing a structure of an example of image reading apparatus to which a capacitance detection method is applied as a medium detection method.

First, a schematic structure of an example of image reading apparatus to which a capacitance detection method is applied as the medium detection method, is shown in FIG. 7A. Schematically, this image reading apparatus comprises a transparent electrode layer 30, a detection circuit 40z, and a reverse-parallel diode circuit DCz. The transparent electrode layer 30 is formed so as to cover almost the entire surface of the array area of a photo-sensor array 100 formed of a plurality of photo-sensors 10 arranged in a matrix. The detection circuit 40z is connected to the transparent electrode layer 30, and starts the image reading operation by detecting a specific capacitance change which is caused between the photo-sensor array 100 connected to a ground potential and the transparent electrode layer 30 when a medium is placed on the transparent electrode layer 30 in contact with the layer 30. The reverse-parallel diode circuit DCz is connected between an escape routing between the transparent electrode layer 30 and detection circuit 40z, and the a ground potential.

Figure 7B:
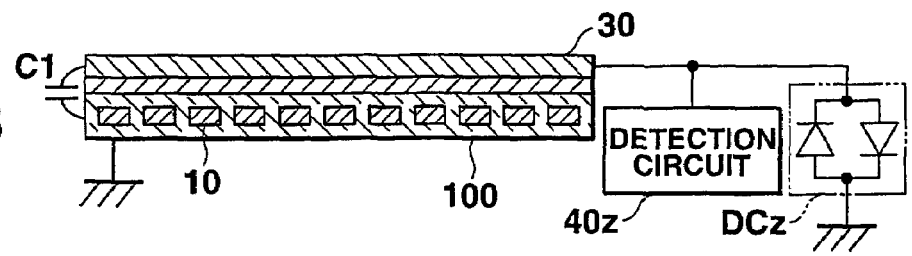
FIG. 7B and FIG. 7C are schematic diagrams for explaining a medium detection method according to a capacitance detection method.
Figure 7C:
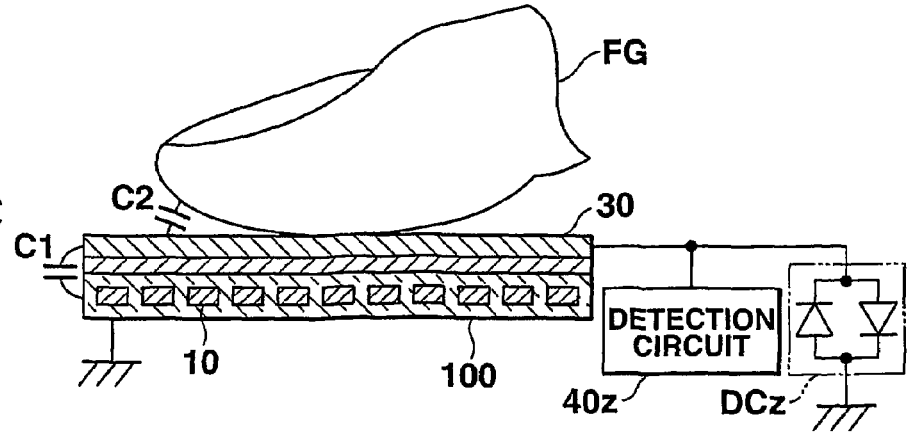

In this structure, when a medium such as a finger FG is placed on the transparent electrode layer 30 in contact therewith, the detection circuit 40z observes a capacitance change (C1→C1+C2) caused by the contact of the finger (human body) as a dielectric with a capacitance C1 inherent in the photo-sensor array 100, as shown in FIG. 7B and FIG. 7C. Thereby, the contact of the finger FG with the detection surface is detected, and each driver is activated and the image reading operation for reading the image pattern (fingerprint) of the medium is automatically started. In a case where the finger FG (human body) is charged with static electricity, the charges (static electricity) are discharged to the ground potential through the escape routing and the reverse-parallel diode circuit DCz.

Figure 8:
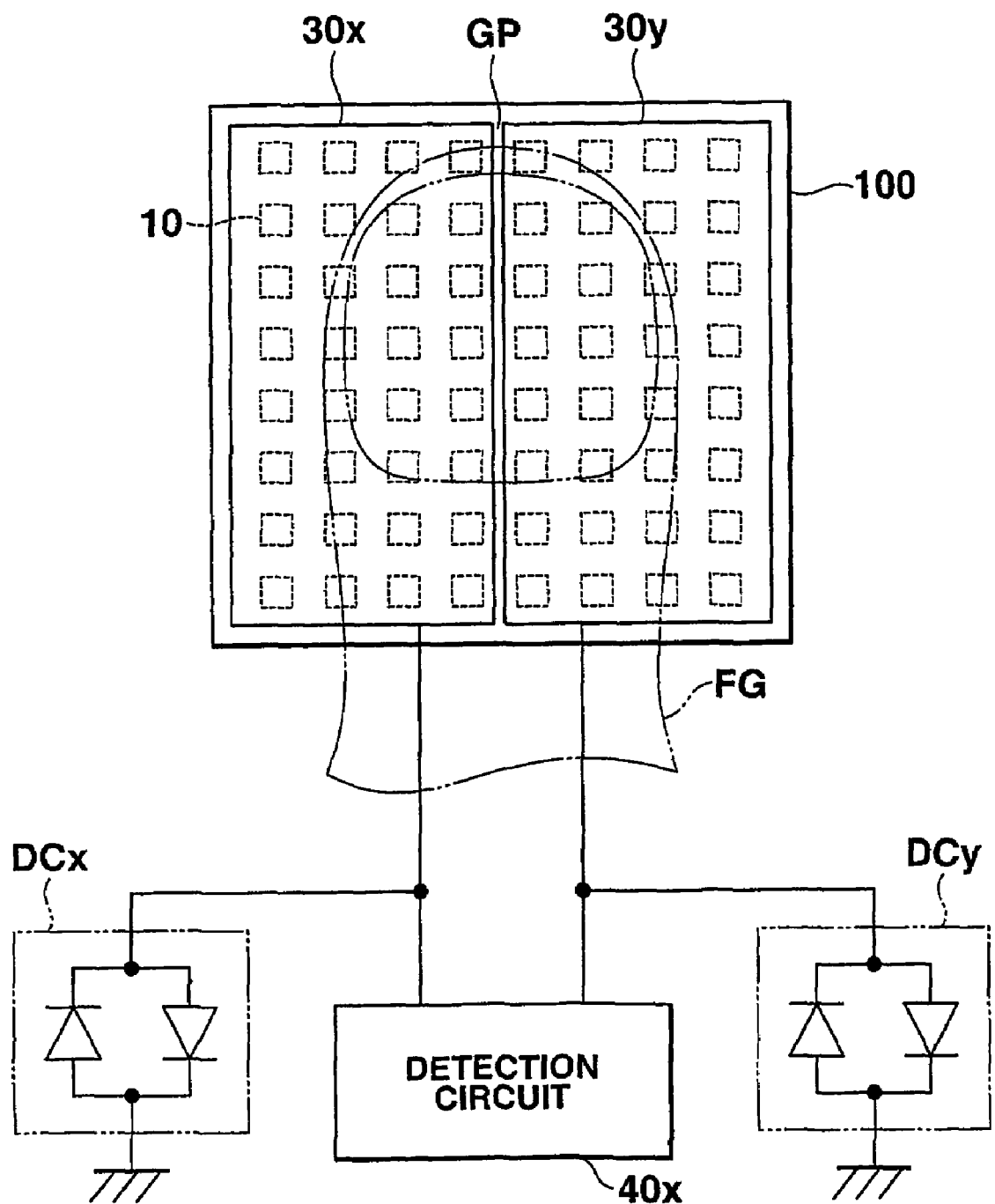
FIG. 8 is a schematic diagram showing a structure of an example of image reading apparatus to which a resistance detection method is applied as a medium detection method.

Next, a schematic structure of an example of image reading apparatus to which a resistance detection method is applied as the medium detection method, is shown in FIG. 8. As shown in FIG. 8, this image reading apparatus comprises transparent electrode layers 30x and 30y, a detection circuit 40x, and reverse-parallel diode circuits DCx, and DCy. The transparent electrode layers 30x and 30y are formed by dividing the array area of a photo-sensor array 100 formed of a plurality of photo-sensors 10 arranged in a matrix, into two parts with a slight gap GP between them. The detection circuit 40x detects a voltage change (or a resistance change) which should occur when a medium such as a finger FG is placed between the transparent electrode layers 30x and 30y in contact therewith by applying a direct current voltage to one of the transparent electrode layers 30x and 30y (the transparent electrode layer 30x, for example) and applying a ground potential to the other (the transparent electrode layer 30y, for example), thereby starts the image reading operation. Each of the reverse-parallel diode circuits DCx and DCy is connected between an escape routing between either of the transparent electrode layers 30x and 30y and the detection circuit 40x, and a ground potential.

In this structure, when a medium such as a finger FG is placed on both the transparent electrode layers 30x and 30y in contact therewith, the detection circuit 40x observes a voltage change which occurs due to a short-circuit caused between the transparent electrode layers 30x and 30y via the finger FG. Thereby, the detection circuit 40x detects the contact of the finger FG with the detection surface, activates each driver, and automatically starts the image reading operation for reading the image pattern (fingerprint) of the medium. In a case where the finger FG (human body) is charged with static electricity, the charges (static electricity) are discharged to the ground potential through the escape routings and the reverse-parallel diode circuits DCx and DCy.

Figure 9A:
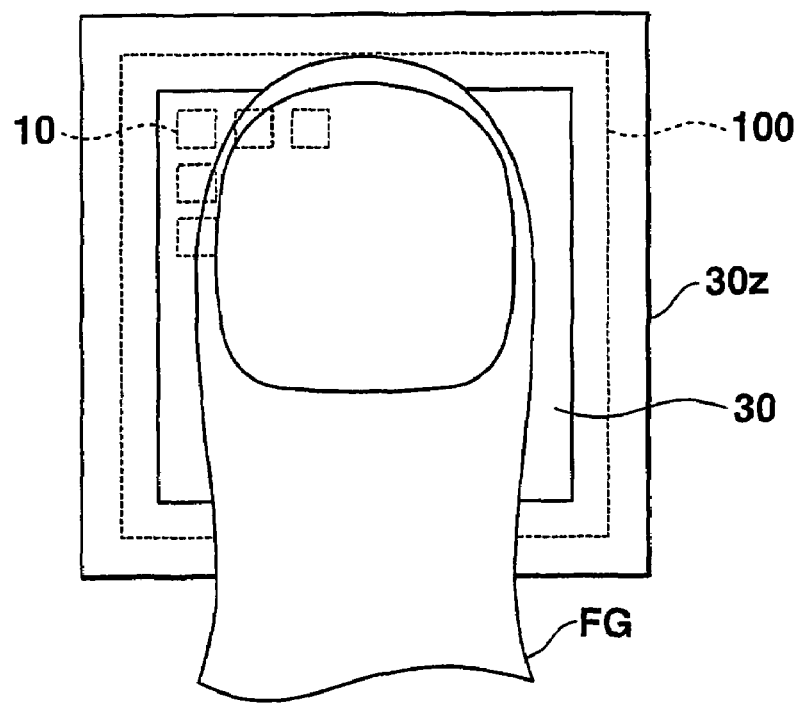
FIG. 9A and FIG. 9B are schematic diagrams showing a structure of an example of image reading apparatus to which another type of resistance detection method is applied as a medium detection method.
Figure 9B:
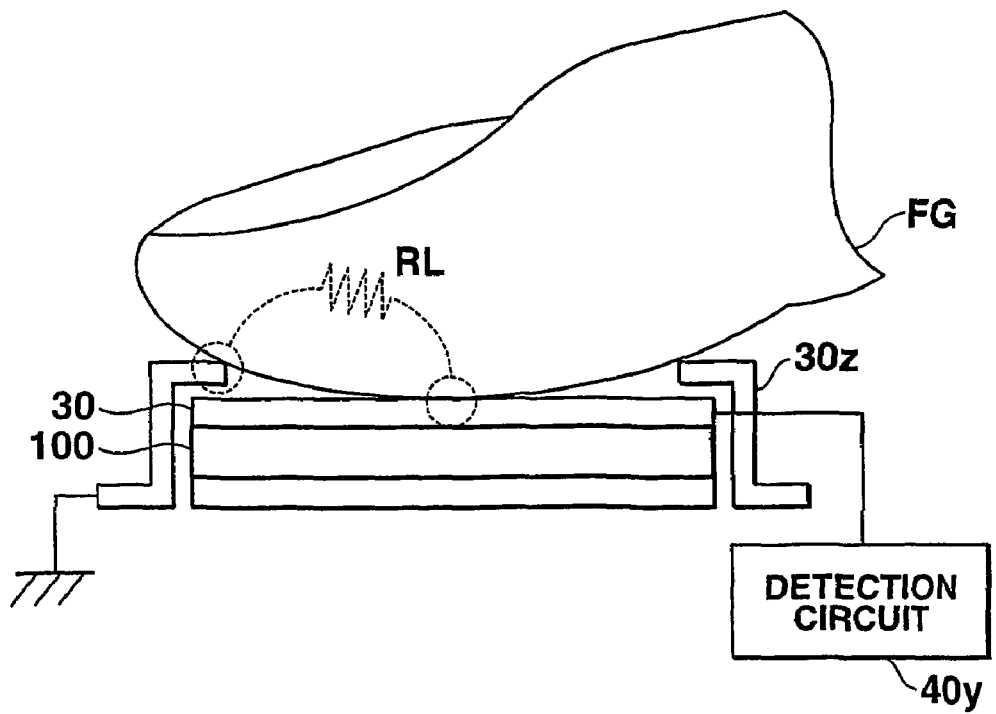

Another example of image reading apparatus according to the resistance detection method is shown in FIG. 9A and FIG. 9B. This image reading apparatus comprises a transparent electrode layer 30, a conductive shield case 30z, and a detection circuit 40y. The transparent electrode layer 30 is formed on the top of a photo-sensor array 100. The shield case 30z is electrically disconnected from at least the transparent electrode layer 30, connected to a ground potential, and provided around the photo-sensor array 100. The detection circuit 40y detects a voltage change (or a change of a resistance RL) which should occur when a medium such as a finger FG is placed between the transparent electrode layer 30 and the shield case 30z in contact therewith by applying a direct current voltage to the transparent electrode layer 30, thereby starts the image reading operation.

In this structure too, when a medium such as a finger FG is placed on both the transparent electrode layer 30 and the shield case 30z in contact therewith, the detection circuit 40y observes a voltage change (resistance change) which occurs due to a short-circuit between the transparent electrode layer 30 and the shield case 30z. Thereby, the contact of the finger FG with the detection surface can be detected.

Figure 10:
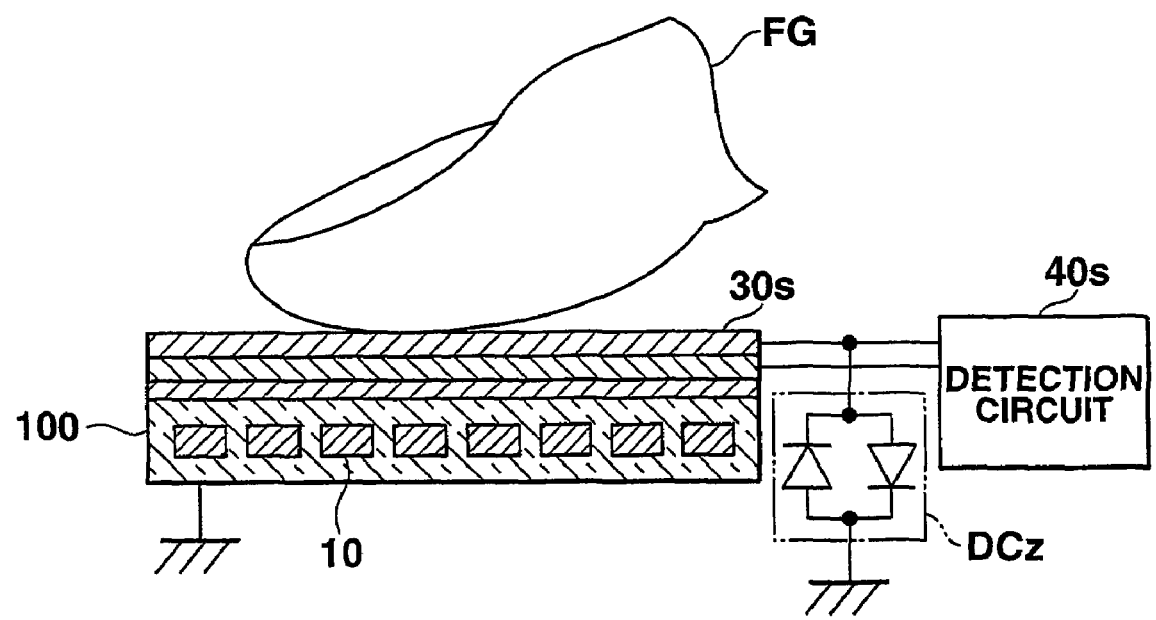
FIG. 10 is a schematic diagram showing a structure of an example of image reading apparatus to which a resistance detection method using a membrane switch is applied as a medium detection method.

Further, as another example of the medium detection method, a schematic structure of an example of image reading apparatus which uses a membrane switch which gets turned on by a pushing force of a medium placed on the sensor array, is shown in FIG. 10. This image reading apparatus comprises a membrane switch 30s and a detection circuit 40s. The membrane switch 30s is formed on a photo-sensor array 100, and has electrodes which face each other vertically, with a slight gap between them. The detection circuit 40s detects a change in the resistance between the electrodes of the membrane switch 30s due to a pushing force of a medium such as a finger FG by applying a predetermined voltage to each electrode of the membrane switch 30s, and thereby starts the image reading operation.

Also in this structure, when a medium such as a finger FG is placed on the membrane switch 30s, the detection circuit 40s observes a change in the resistance between the electrodes of the membrane switch 30s which is caused by the pushing force of the medium. Thereby, the detection circuit 40s can detect the contact of the finger FG with the detection surface.

The present invention is not limited to the above-described medium detection methods. For example, a pressure sensor for detecting a pushing force of a medium may be provided under the sensor array. In short, anything that can be provided upon or around the sensor array, and generates a change in a signal component in accordance with whether a medium is placed on a detection surface in contact therewith, can be applied to the present invention.

Next, specific embodiments of the image reading apparatus according to the present invention will be explained. In the following embodiments, a case where the above-explained double-gate photo-sensor is employed as a sensor will be explained. However, a sensor applicable to the present invention is not limited to the double-gate photo-sensor, but other types of photo-sensors such as photodiodes, TFTs, etc. can be employed. Further, in the following embodiments, an optical photo-sensor is employed. However, for example, a capacitance detecting type sensor which reads a medium image by reading a capacitance which changes in accordance with projections and depressions of a finger may be employed.

Further, a case where the above-described capacitance detection method is employed as the medium detection method will be explained. However, the medium detection method is not limited to this. Any one of the other methods described above may be employed.

First Embodiment of Image Reading Apparatus

Figure 11:
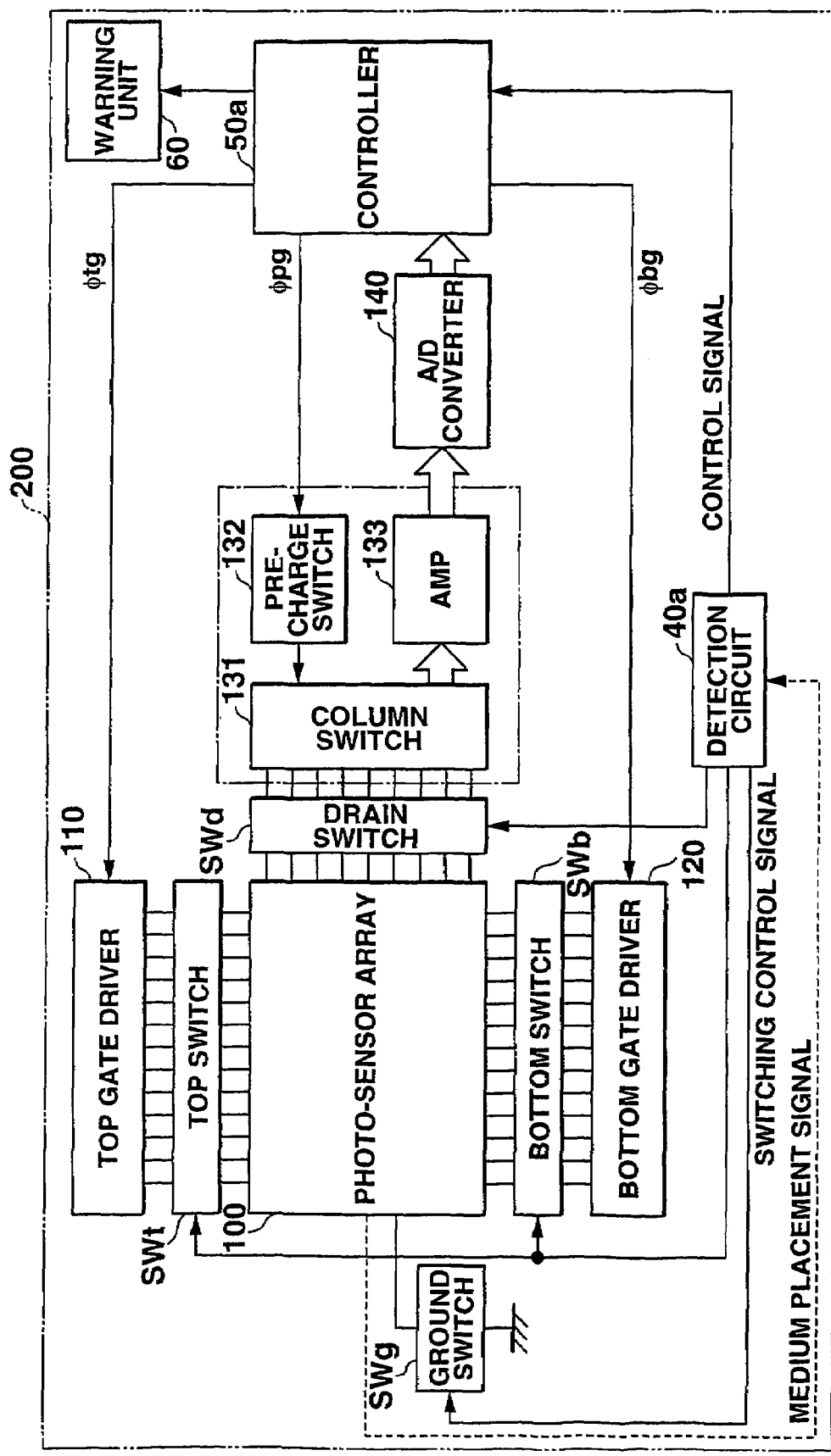
FIG. 11 is a block diagram showing an entire structure of an image reading apparatus according to a first embodiment of the present invention.
Figure 12:
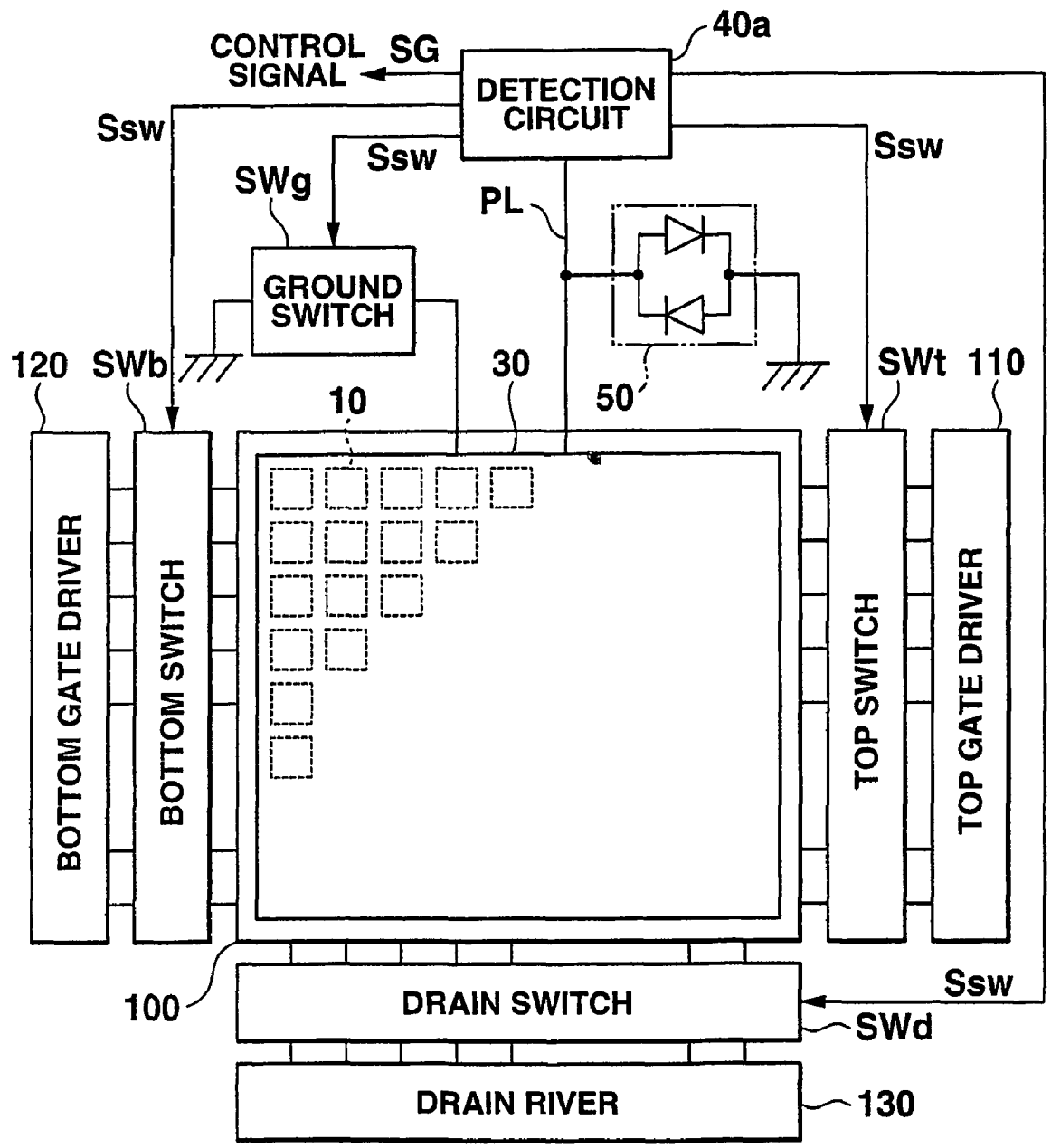
FIG. 12 is a diagram showing a structure of a principal part of the image reading apparatus according to the first embodiment of the present invention.
Figure 13:
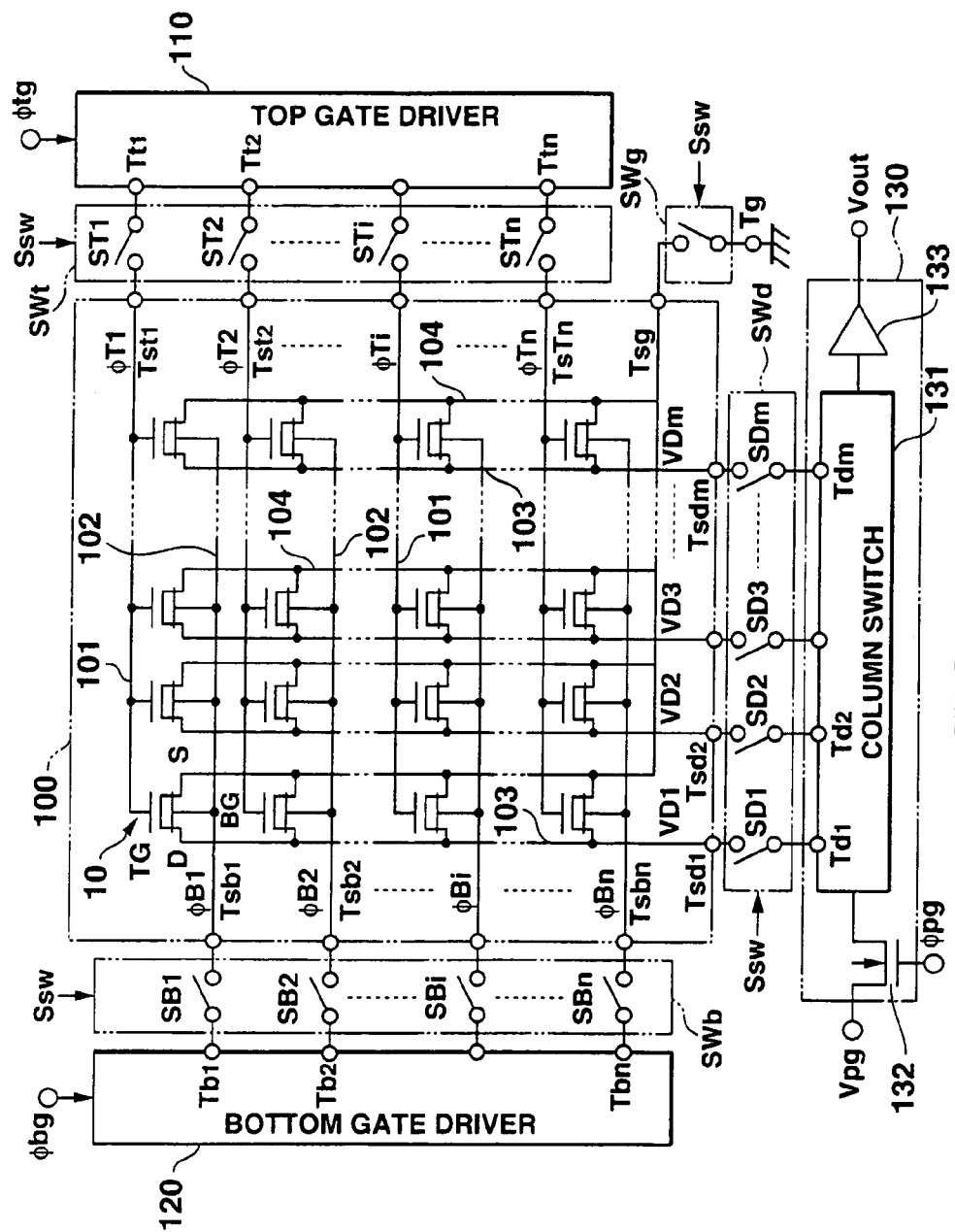
FIG. 13 is a diagram shoving a circuit structure of the principal part of the image reading apparatus according to the first embodiment of the present invention.

FIG. 11 is a block diagram showing the whole structure of the image reading apparatus according to a first embodiment of the present invention. FIG. 12 is a diagram showing a structure of the principal part of the image reading apparatus according to the present invention. FIG. 13 is a diagram showing a circuit structure of the principal part of the image reading apparatus according to the present embodiment.

The following explanation will be made by timely referring to the structure of the above described photo-sensor system (see FIG. 5 and FIG. 6). Components same as components shown in FIG. 1A, FIG. 1B, and FIG. 5 will be denoted by the same reference numerals, and explanation of such components will be simplified or omitted.

As shown in FIG. 11, the image reading apparatus 200 according to the present invention comprises a photo-sensor system including a photo-sensor array 100, a top gate driver 110, a bottom gate driver 120, a drain driver 130, an analog-digital converter (hereinafter referred to as A/D converter) 140, and a controller (operation controlling means) 50a. The photo-sensor array 100 is formed by arranging the above-described double-gate photo-sensors 10 in a matrix. The top gate driver 110 is connected to the photo-sensor array 100 (double-gate photo-sensors 10) in the line direction, and applies a predetermined reset pulse to the top gates TG of the double-gate photo-sensors 10 at a predetermined timing. The bottom gate driver 120 applies a predetermined reading pulse to the bottom gates BG of the double-gate photo-sensors 10 at a predetermined timing. The drain driver 130 includes a column switch 131, a pre-charge switch 132, and an amp 133, and applies a pre-charge voltage to the double-gate photo-sensors 10 and reads out a data line voltage. The A/D converter 140 converts a data voltage of an analog signal which has been read out, into image data composed of a digital signal. The controller 50a obtains image data by controlling the operation of each driver, and controls execution of predetermined image processing (extra processing, collating, etc.) to be applied to the obtained image data. In addition to the photo-sensor system, the image reading apparatus 200 comprises a top switch SWt, a bottom switch SWb, a drain switch SWd, a ground switch SWg, a detection circuit (medium detector) 40a, and a warning unit (warning unit) 60. The top switch SWt, the bottom switch SWb, and the drain switch SWd are provided between the photo-sensor array 100 and the top gate driver 110, bottom gate driver 120, and drain driver 130 respectively, in order to intermittently keep electrical connection therebetween. The ground switch SWg is connected between the photo-sensor array 100 and a ground potential, and intermittently keeps electrical connection between the photo-sensor array 100 and the ground potential. The detection circuit 40a detects whether or not a medium is placed on a detection surface provided upon the photo-sensor array 100 when it is supplied with a medium placement signal relating to a placement and contact state of the medium, controls the above-described top switch SWt, bottom switch SWb, drain switch SWd, and ground switch SWg, and prompts the controller 50a to perform controlling operations such as starting and stopping of the image reading operation by supplying a control signal to the controller 50a. The warning unit 60 has a warning unit such as a buzzer, a speaker, a light emitting lamp, a display device, etc. In a case where the medium is separated from the detection surface in the middle of the medium image reading, the warning unit 60 notifies the fact by sound, light, message display, etc.

The above-described capacitance detection method, resistance detection method, or various other methods can be employed as a medium detection method which includes the detection circuit 40a, and is for detecting whether a medium is placed on the detection surface. The medium detection method must include a mechanism (hereinafter referred to as medium detection mechanism) such as the transparent electrode layer 30 shown in FIG. 12, which is formed on the photo-sensor array 100. The medium detection mechanism must be such as can be provided upon or around the photo-sensor array 100, and having an electrical signal component such as resistance, capacitance, voltage, current, etc. which changes in accordance with a contact state of the medium. The detection circuit 40a monitors a medium placement signal from the medium detection mechanism all the time and detects whether a medium is in contact with or out of contact with the detection surface. In a case where the capacitance detection method is employed as the medium detection method, the detection circuit 40a monitors a capacitance change in the transparent electrode layer 30 all the time through an escape routing PL. If the detection circuit 40a detects any capacitance change which should occur when a medium is placed on the transparent electrode layer 30 in contact therewith, the detection circuit 40a outputs a switching control signal Ssw for switching between the top switch SWt, the bottom switch SWb, the drain switch SWd, and the ground switch SWg, and also outputs a control signal SG for starting the image reading operation of the image reading apparatus.

The image reading apparatus 200 according to the present invention further comprises a reverse-parallel diode circuit 50 which is connected between the escape routing PL and the ground potential, and a plane light source (not shown) set at the back of the sensor array 100, as shown in FIG. 12.

The reverse-parallel diode circuit 50 discharges static electricity charged to a medium (finger) placed in contact with the detection surface on the top of the transparent electrode layer 30 to the ground potential, and thus prevents or suppresses electrostatic damages of the double-gate photo-sensors 10 and detection circuit 40.

Specifically, the top switch SWt is constituted by switches ST1, ST2, ... STn each of which is provided for one of a plurality of top gate lines 101 each of which connects the top gate terminals TG of the double-gate photo-sensors 10 of the photo-sensor array 100 in the line direction, as shown in FIG. 13. In response to a switching control signal Ssw output from the detection circuit 40, these switches ST1, ST2, ... STn are simultaneously turned ON or turned OFF in synchronization.

Likewise, as shown in FIG. 13, the bottom switch SWb is constituted by switches SB1, SB2, ... SBn each of which is provided for one of a plurality of bottom gate lines 102 each of which connects the bottom gate terminals BG of the double-gate photo-sensors 10 in the column direction. The operational state (ON state or OFF state) of these switches is controlled based on the switching control signal Ssw.

Further, as shown in FIG. 13, the drain switch SWd is constituted by switches SD1, SD2, ... SDm each of which is provided for one of a plurality of drain lines 103 each of which connects the drain terminals D of the double-gate photo-sensors 10 in the column direction. The operational state (ON state or OFF state) of these switches is controlled based on the switching control signal Ssw.

Further, as shown in FIG. 13, the ground switch SWg is provided for source lines (common lines) 104 each of which connects the source terminals S of the double-gate photo-sensors 10. The operational state (ON state or OFF state) of the ground switch SWg is controlled based on the switching control signal Ssw.

Accordingly, this group of switches (top switch SWt, bottom switch SWb, drain switch SWd, and ground switch SWg; hereinafter referred to as "switch group") is turned ON or turned OFF in synchronization by a single switching control signal Ssw which is to be output from the detection circuit 40 when a medium is placed on the detection surface on the transparent electrode layer in contact therewith.

As shown in FIG. 13, each of the photo-sensor array 100, the top gate driver 110, the bottom gate driver 120, the drain driver 130, and the ground potential is formed into a unit body. The photo-sensor array 100 has external connection terminals Tst1, Tst2, ... Tstn for the respective top gate lines 101, has external connection terminals Tsb1, Tsb2, ... Tsbn for the respective bottom gate lines 102, has external connection terminals Tsd1, Tsd2, ... Tsdm for the respective drain lines 103, and has an external connection terminal Tsg for the source lines 104. Thereby, the photo-sensor array 100 is connectable to other components at these external connection terminals.

On the other hand, the top gate driver 110 is provided with external connection terminals Tt1, Tt2, ... Ttn in correspondence with the respective top gate lines 101 (the external connection terminals Tst1, Tst2, ..., Tstn). The bottom gate driver 120 is provided with external connection terminals Tb1, Tb2, ... Tbn in correspondence with the respective bottom gate lines 102 (the external connection terminals Tsb1, Tsb2, ... Tsbn). The drain driver 130 is provided with external connection terminals Td1, Td2, ... Tdm in correspondence with the respective drain lines 103 (the external connection terminals Tsd1, Tsd2, ... Tsdm). The ground potential is provided with an external connection terminal Tg in correspondence with the source lines 104 (the external connection terminal Tsg).

Accordingly, each switch of the switch group is connected between the pre-provided external connection terminals mentioned above, for the sake of terminal connections between the photo-sensor array 100 and the top gate driver 110, between the photo-sensor array 100 and the bottom gate driver 120, between the photo-sensor array 100 and the drain driver 130, and between the photo-sensor array 100 and the ground potential.

Next, a driving operation which will be performed in a case where the image reading apparatus having the above-described structure is applied to a fingerprint reading apparatus, will be explained with reference to the drawings.

Figure 14:
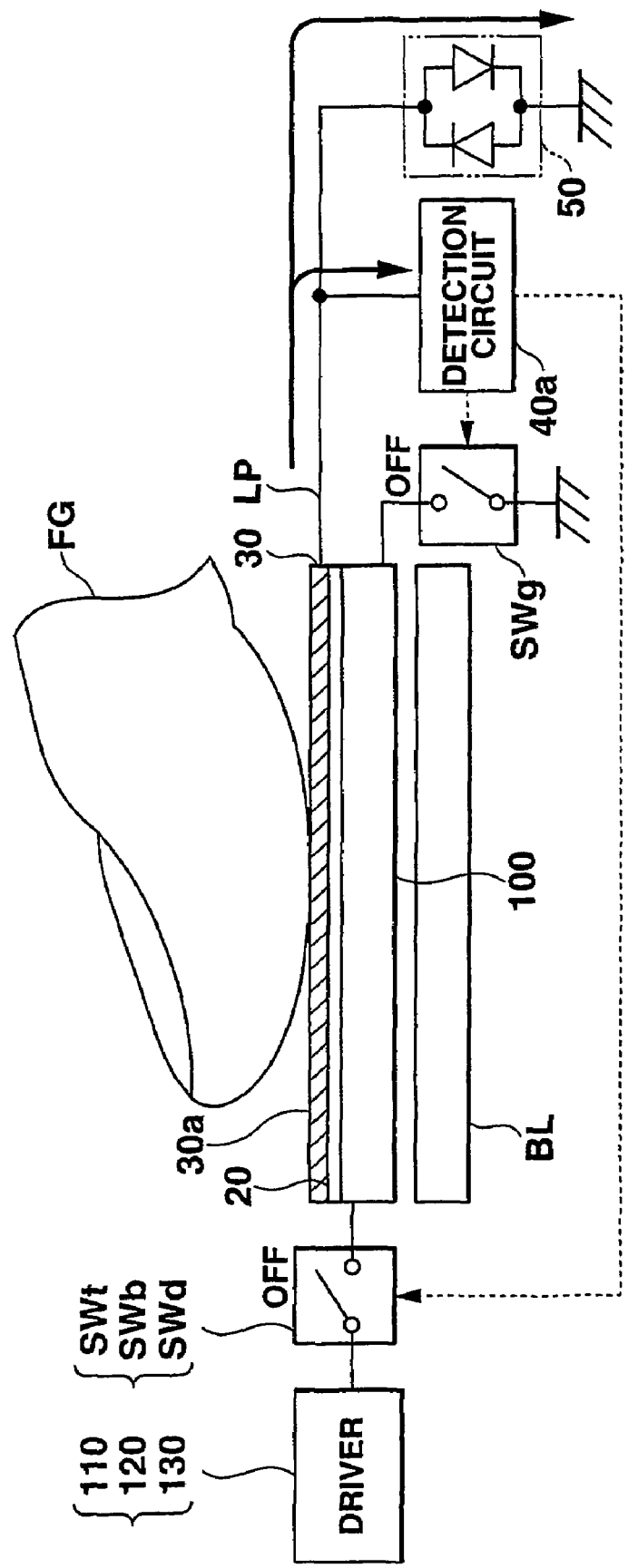
FIG. 14 is a schematic diagram showing a state immediately after a medium gets in contact with a detection surface in a case where the image reading apparatus according the first embodiment of the present invention is applied to a fingerprint reading apparatus.

FIG. 14 is a schematic diagram showing a state immediately after a medium falls in contact with a detection surface, in a case where the image reading apparatus according to the present embodiment is applied to a fingerprint reading apparatus.

Figure 15:
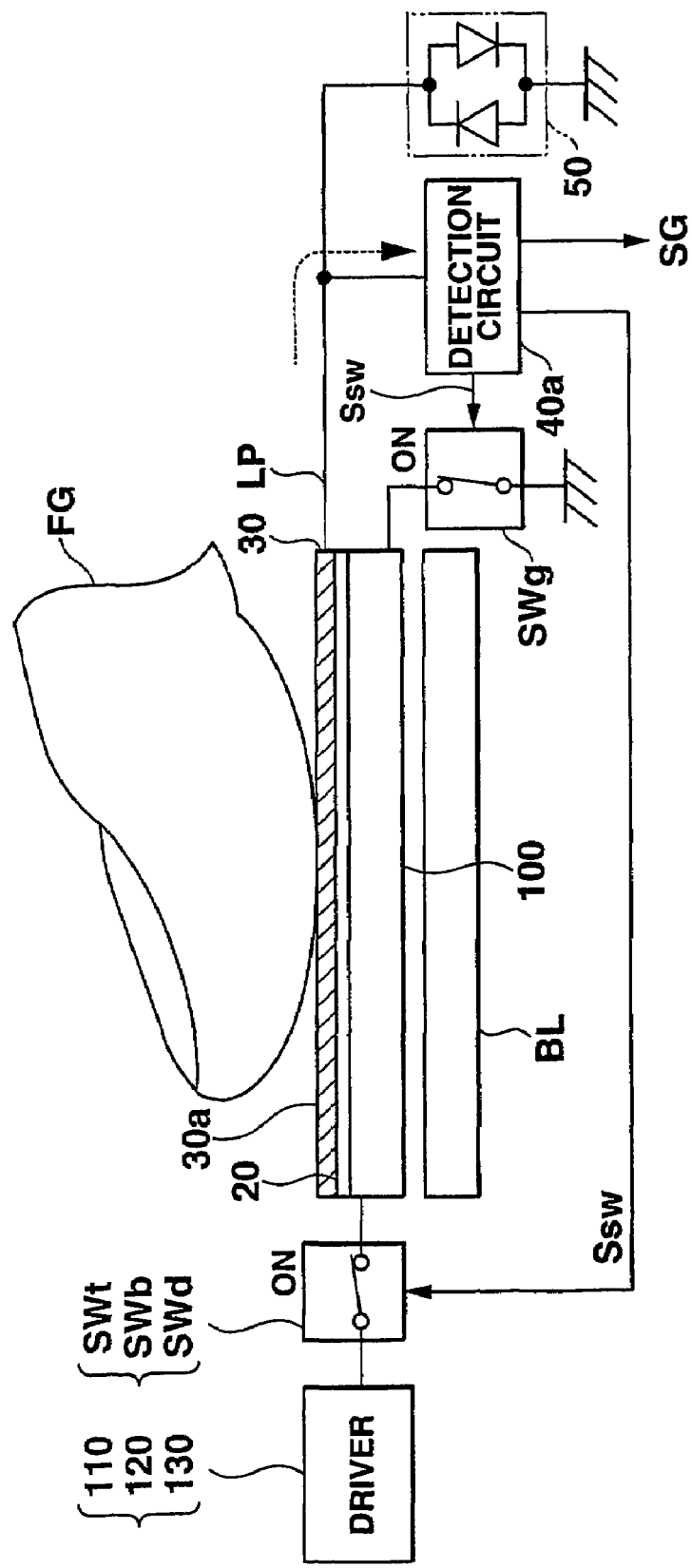
FIG. 15 is a schematic diagram showing a state when an image reading operation is started, in a case where the image reading apparatus according to the first embodiment of the present invention is applied to a fingerprint reading apparatus.

FIG. 15 is a schematic diagram showing a state where the image reading operation gets started, in a case where the image reading apparatus according to the present embodiment is applied to a fingerprint reading apparatus.

(Waiting State)

According to a fingerprint reading apparatus (image reading apparatus) 200 having the above-described structure, in a waiting state such as immediately after power supply to the fingerprint reading apparatus 200 is started, or a non-contact state where a finger (medium) is not placed on a detection surface 30a of the transparent electrode layer 30 on the top of the photo-sensor array 100, the detection circuit 40a does not output a switching control signal Ssw. Therefore, each of the switches in the switch group between the photo-sensor array 100 and the group of drivers (top gate driver 110, bottom gate driver 120, and drain driver 130; hereinafter referred to as "driver group"), and between the photo-sensor array 100 and the ground potential is kept turned OFF.

Let a case be assumed where the above-described capacitance detection method is employed as the medium detection method. In this case, if the apparatus 200 is in the non-contact state, the apparatus 200 can be the to be in a floating state where the source terminal S (source line 104) of each double-gate photo-sensor 10 constituting the photo-sensor array 100 is not connected to the ground potential. In this state, almost no capacitance whatsoever is generated between the transparent electrode layer 30 and the photo-sensor array 100. Therefore, any capacitance that is observed by the detection circuit 40a which is connected to the transparent electrode layer 30 is 0, or an extremely small value.

Further, in the non-contact state, by controlling the switch group to be kept in the OFF state, it is possible for each double-gate photo-sensor 10 of the photo-sensor array 100 not to be applied a bias voltage. Due to this, application of a bias voltage to each double-gate photo-sensor 10 is limited to only when a medium is placed. Accordingly, it is possible to prevent deterioration of the characteristic of each double-gate photo-sensor 10 due to application of a bias voltage for a long time.

(Immediately After Contact)

In the fingerprint reading apparatus 200 which has been in the non-contact state, a capacitance of about 100 pF is generated between the transparent electrode layer 30 and a finger FG immediately after the dielectric finger FG is placed on the detection surface 30a in contact therewith as shown in FIG. 14. The detection circuit 40a detects this capacitance change (indicated by a thin arrow in FIG. 14).

According to the present embodiment, it is possible to relatively easily detect a small capacitance change (about 100 pF) which is generated by the contact of the finger FG, because a capacitance inherently existing between the transparent electrode layer 30 and the photo-sensor array 100 in the non-contact state is almost equal to 0 as described above.

Contrary to this, if the source terminal S of each double-gate photo-sensor 10 is not structured to be in the floating state when in the non-contact state, but is structured to be connected to the ground potential all the time as conventional, a capacitance existing between the transparent electrode layer 30 and the photo-sensor array 100 in the non-contact state will be a relatively large value of about 6000 pF. Therefore, in order to detect a small capacitance change to be generated by the contact of the finger FG, the detection sensitivity must be sufficiently high. This increases the cost of the detection circuit 40a. However, according to the present invention, the capacitance existing between the transparent electrode layer 30 and the photo-sensor array 100 in the non-contact state is almost 0, as described above. This makes the detection of a small capacitance change due to the contact of the finger FG easier. And a detection circuit having a relatively low detection sensitivity can be employed as the detection circuit 40a, resulting in a reduced cost.

Further, even in a case where the finger FG is charged with static electricity (charges) at the time when the finger FG is placed on the detection surface 30a in contact therewith and a capacitance change is to be detected, the charges will not flow through the double-gate photo-sensors 10, but will be discharged to the ground potential via the escape routing PL and the reverse-parallel diode circuit 50 (shown by bold arrows in FIG. 14). This is because the switch group is kept turned OFF, and electrical connection between the photo-sensor array 100 and the driver group and between the photo-sensor array 100 and the ground potential are cut off, as described above. Therefore, it is possible to prevent or suppress occurrence of electrostatic damages and malfunctioning of the double-gate photo-sensors 10, the driver group, and the detection circuit 40a.

(Start of Fingerprint Reading Operation)

As described above, when the detection circuit 40a detects the capacitance change which should occur due to the contact of the finger FG with the detection surface 30a, a switching control signal Ssw is output to the switch group so that the switch group may be switched ON, and the photo-sensor array 100 may be electrically connected to the driver group and the ground potential, as shown in FIG. 15. Along with this, a control signal SG for controlling the fingerprint reading apparatus 200 to start the fingerprint reading operation is output to the controller 50a, thereby the fingerprint reading operation is started.

That is, immediately after the finger FG is placed on the detection surface 30a in contact therewith, static electricity is discharged to the ground potential through the reverse-parallel diode circuit 50 in quite a short time in a case where the finger FG is charged with static electricity, and at the same time, a capacitance change in the transparent electrode layer 30 due to the contact of the finger FG is detected. Afterwards, the switch group is switched, and the fingerprint reading operation is started.

Also while the fingerprint reading operation is performed, the capacitance in the transparent electrode layer 30 is monitored by the detection circuit 40a all the time (shown by an arrow of a broken line in FIG. 15). If a reduction in the capacitance generated due to the contact between the transparent electrode layer 30 and the dielectric finger FG is detected, the detection circuit 40a detects that the finger FG is separated from the detection surface 30a. In response to this, the detection circuit 40a supplies a control signal SG for stopping the fingerprint reading operation to the controller 50a so as to stop the fingerprint reading operation, and to put the fingerprint reading apparatus 200 in the above-described waiting state. That is, the fingerprint reading apparatus 200 is set back to a state where electrical connection between the photo-sensor array 100 and the driver group, and the ground potential is cut off, just like the above-described waiting state (see FIG. 14), by switching OFF the switch group by stopping supplying the switching control signal Ssw.

At this time, by driving the warning unit 60, a notification that the medium has lost contact with the detection surface in the middle of the fingerprint reading operation, thereby the image reading operation has been stopped (suspended), may be made to the user of the apparatus 200 with a sound, light, message display, or the like.

Further, also when the fingerprint reading operation is completed, the fingerprint reading apparatus 200 is set back to the waiting state, by switching OFF the switch group with a stop of supply of the switching control signal Ssw under the control of the controller 50a.

As described above, according to the present embodiment, each sensor of the sensor array is electrically cut off from each driver circuit and the ground potential, in the non-contact state where a medium is not placed on the detection surface. In the non-contact state, a bias voltage is not applied to each sensor. A bias voltage is applied to each sensor only when a medium is placed on the detection surface. Therefore, it is possible to restrict deterioration of the characteristic of each sensor 10 due to application of a bias voltage for a long time and thus to improve reliability of the image reading apparatus.

Further, in the waiting state where no medium is placed on the detection surface, no current flows through each sensor. Therefore, it is possible to reduce power consumption during the waiting time.

Furthermore, in a case where the capacitance detection method is employed as the medium detection method, since the apparatus 200 is so structured that the capacitance existing between the transparent electrode layer 30 and the photo-sensor array 100 in the non-contact state can be suppressed to a very small value, it is possible to easily detect a capacitance change due to a contact of a medium.

Second Embodiment of Image Reading Apparatus

Figure 16:
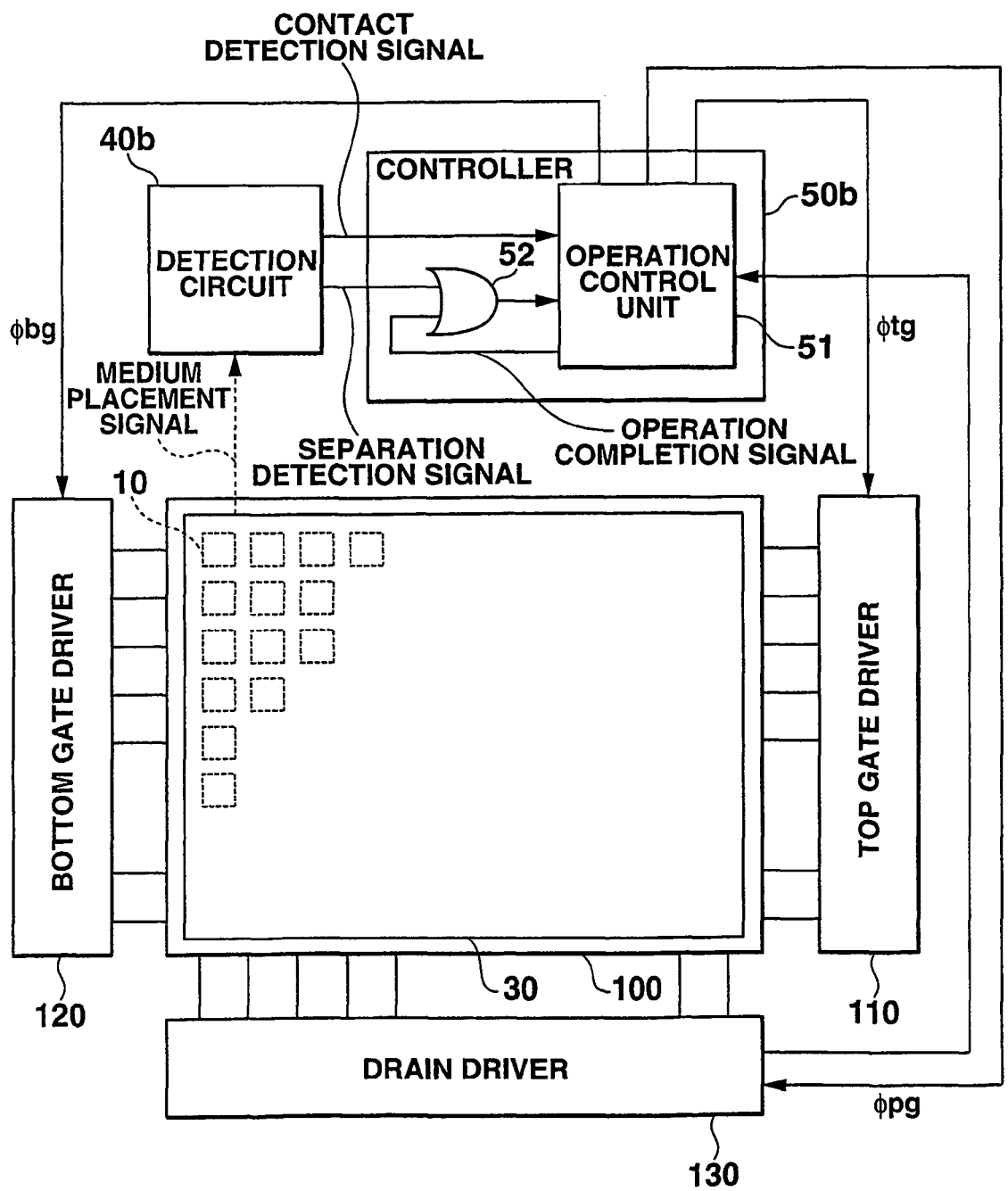
FIG. 16 is a diagram showing a structure of a principal part of an image reading apparatus according to a second embodiment of the present invention.

FIG. 16 is a diagram showing a principal part of an image reading apparatus according to a second embodiment of the present invention.

The explanation will be made below by timely referring to the structure of the above described photo-sensor system (see FIG. 5 and FIG. 6). Components same as components shown in FIG. 1A, FIG. 1B, and FIG. 5 will be denoted by the same reference numerals, and explanation of such components will be simplified or omitted.

The present embodiment relates to a structure for driving the photo-sensor array in accordance with whether a medium is placed on the detection circuit, in the image reading apparatus having the same structure as the above described first embodiment.

As shown in FIG. 16, the image reading apparatus according to the present embodiment comprises a detection circuit (medium detector) 40b and a controller (operation controlling means) 50b. The detection circuit 40b detects whether a medium is in contact with or is separated from the detection surface by always monitoring a medium placement signal from a medium detection mechanism constituted by the transparent electrode layer 30 formed on the photo-sensor array 100, and outputs a detection signal in accordance with the detected state (contact detection signal or separation detection signal). The controller 50b receives a detection signal output from the detection circuit 40b, starts the image reading operation of the above-described photo-sensor system and obtains image data of the medium in accordance with at least a contact detection signal of the detection signal, and stops the image reading operation in accordance with a separation detection signal of the detection signal. Further, the controller 50b applies predetermined image processing (extra processing, collating, etc.) to the obtained image data.

As the detection signal to be output from the detection circuit 40b to the controller 50b, a high-level contact detection signal and a low-level separation detection signal are to be output in a case where contact of a medium with the detection surface is detected. On the other hand, in a case where separation of a medium from the detection surface is detected, a low-level contact detection signal and a high-level separation detection signal are to be output.

The controller 50b includes an operation control unit 51 and an OR logic unit 52, as shown in FIG. 16. The operation control unit 51 controls the start and stop of the operation for reading a medium image based on a detection signal (contact detection signal or separation detection signal) output from the detection circuit 40b and an operation completion signal which is generated when the image reading operation of the above-described photo-sensor system is completed. The OR logic unit 52 controls inputting of a detection signal (separation detection signal) and an operation completion signal to the operation control unit 51.

The operation control unit 51 performs control for starting an operation for reading a medium image by directly receiving a contact detection signal output from the detection circuit 40b as a reading operation start signal. Further, the operation control unit 51 performs control for stopping the operation for reading a medium image by receiving a logic sum (OR) of a separation detection signal output from the detection circuit 40b and an operation completion signal generated inside the operation control unit 51, as a reading operation stop signal.

Accordingly, in a case where a medium gets in contact with the detection surface, the operation control unit 51 shifts the photo-sensor system to the operation for reading the medium image, in accordance with a contact detection signal output from the detection circuit 40b.

On the other hand, in a case where the medium is separated from the detection surface, or in a case where the image reading operation is completed, the operation control unit 51 controls outputting of control signals φtg, φbg, and φpg to the drivers of the photo-sensor system (the top gate driver 110, the bottom gate driver 120, and the drain driver 130), so as to stop or complete the image reading operation and to set the image reading apparatus to the waiting state in accordance with a separation detection signal output from the detection circuit 40b or in accordance with an operation completion signal generated inside the operation control unit 51.

Accordingly, in the image reading apparatus according to the present embodiment, in a case where a medium gets in contact with the detection surface, the image reading operation is automatically started by the controller 50b. In a case where the medium is separated from the detection surface, the image reading operation is forcibly stopped (suspended) by the controller 50b even in the middle of the image reading operation, so that the driving of the photo-sensor array is stopped.

The structure of the controller according to the present embodiment is merely one of examples applicable to the present invention. The present invention is not limited to this structure. Any structure is possible as long as it can at least start or stop the image reading operation in the photo-sensor system in accordance with a detection signal output from the detection circuit. Further, a contact detection signal and the separation detection signal may be a single signal.

Next, a specific drive control operation for the image reading apparatus having the above-described structure will be explained with reference to the drawings.

Figure 17:
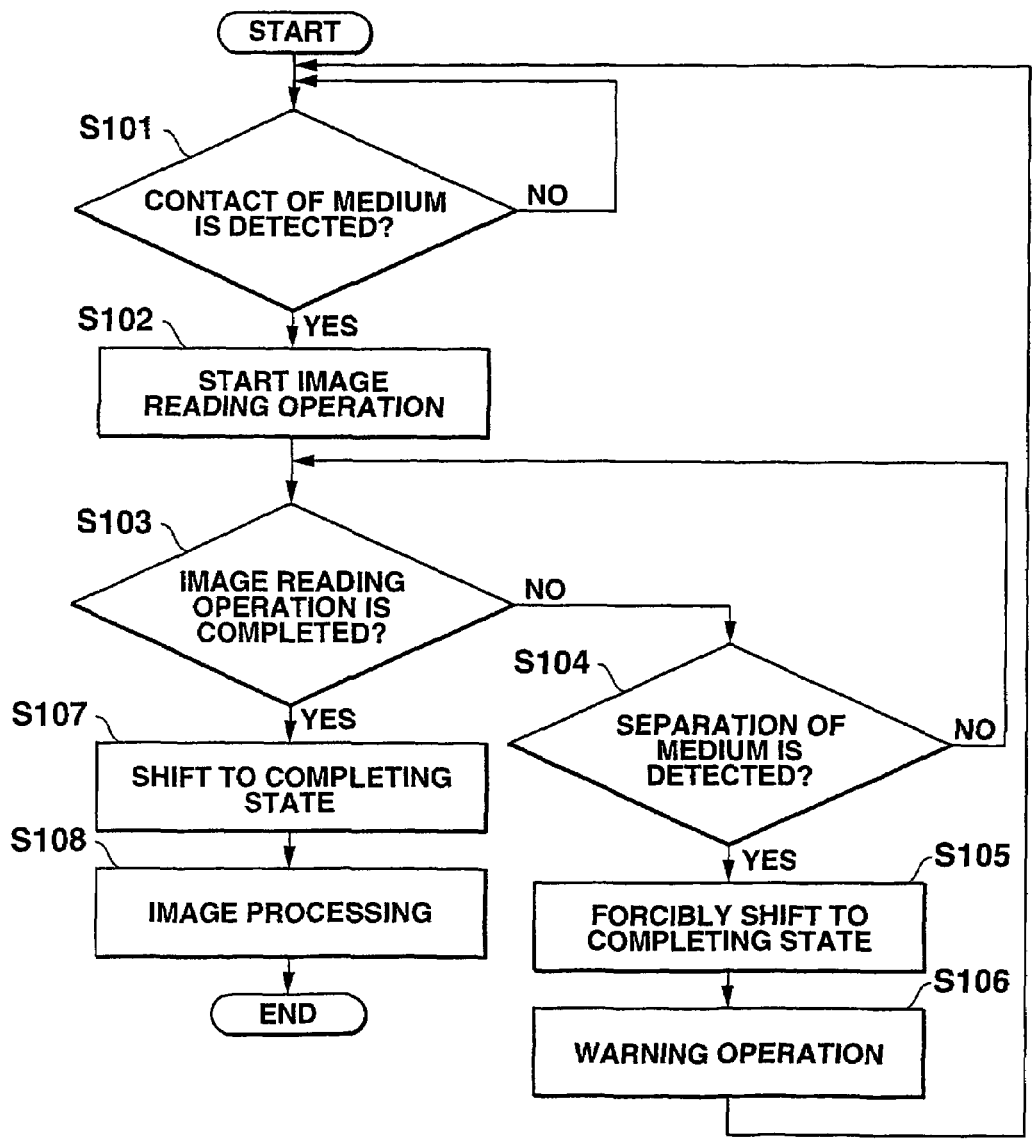
FIG. 17 is a flowchart showing a drive control operation for the image reading apparatus according to the second embodiment.
Figure 18:
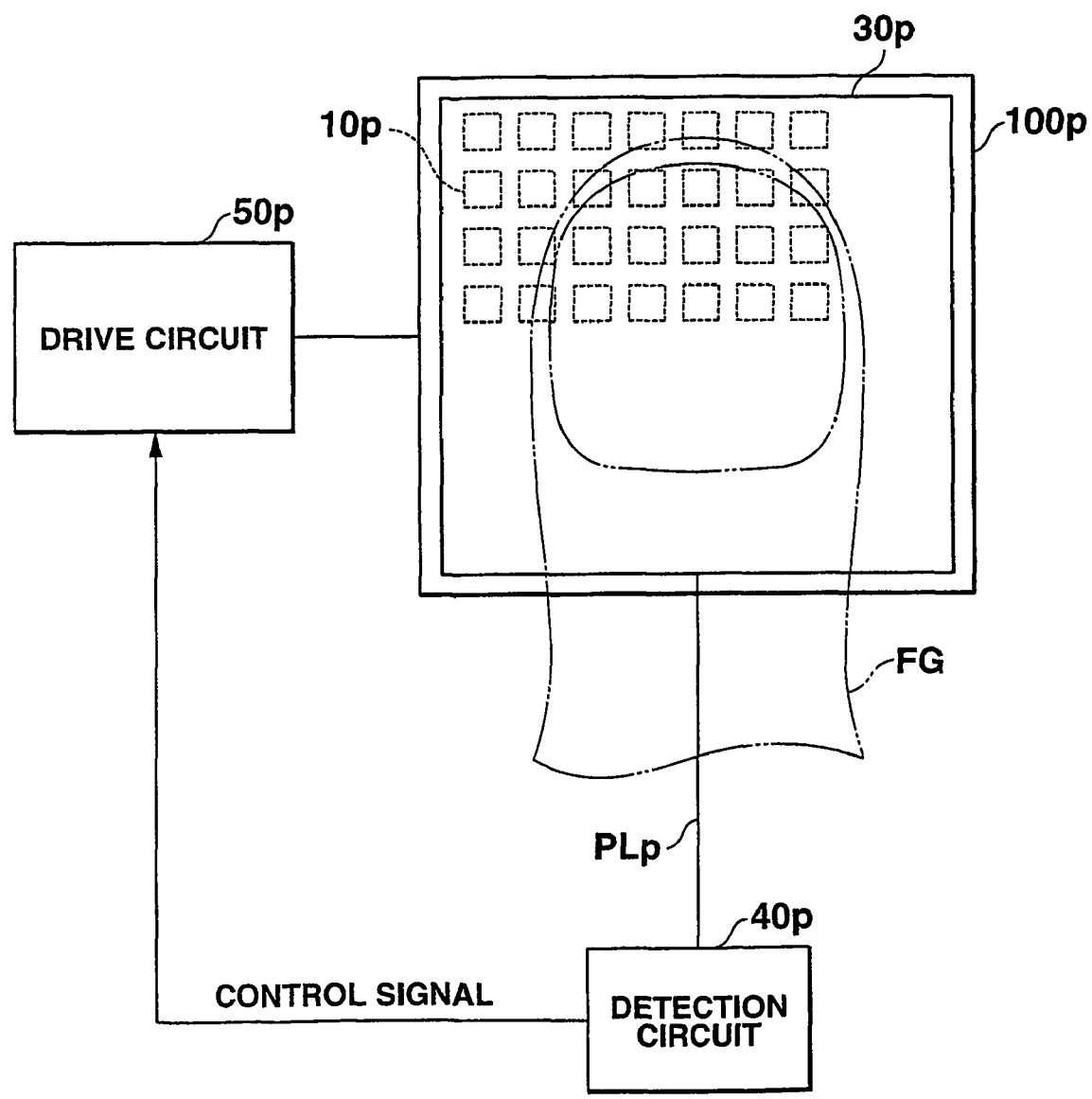
FIG. 18 is a schematic diagram showing a structure of an example of a conventional image reading apparatus having a function for detecting whether a medium is placed.
Figure 19A:
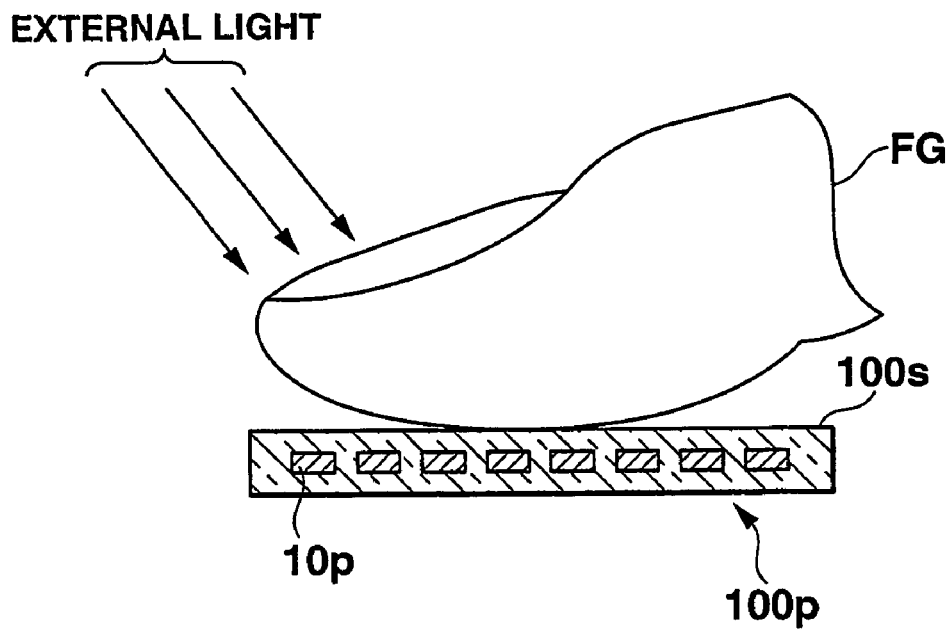
FIG. 19A and FIG. 19B are schematic diagrams for explaining a problem of a conventional image reading apparatus.
Figure 19B:
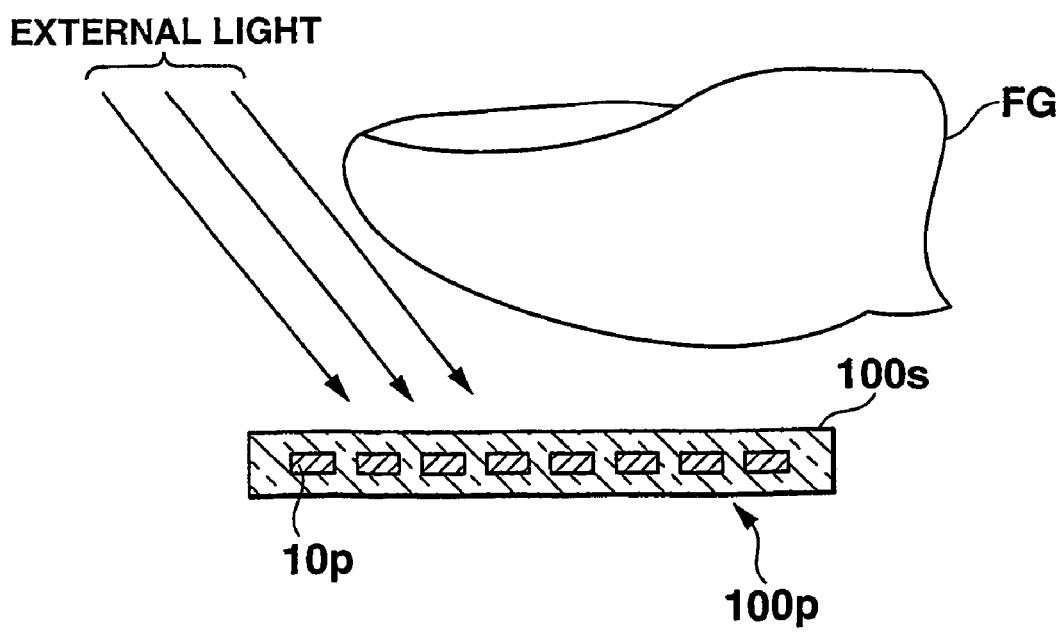

FIG. 17 is a flowchart showing a drive control operation for the image reading apparatus according to the present embodiment. The following explanation will be made by timely referring to the above-described structure of the image reading apparatus (FIG. 12).

(S101)

First, when power supply to the image reading apparatus 200b is started, the detection circuit 40b and the controller 50b are in a state to be driven, and the image reading apparatus 200b are set to the waiting state.

That is, the detection circuit 40b gets into a state of monitoring all the time whether a medium is placed on the detection surface formed on the photo-sensor array 100. The detection circuit 40b continues the operation for monitoring a change in the electrical component of a signal obtained from the medium detection mechanism formed around the photo-sensor array 100.

In this state, when a medium is placed on the detection surface in contact therewith, the detection circuit 40b detects the state where the medium is in contact with the detection surface by a change in the component of a signal obtained from the medium detection mechanism, and outputs a contact detection signal to the controller 50b (operation control unit 51).

(S102)

The controller 50b (operation control unit 51) starts the image reading operation by receiving the contact detection signal as a reading operation start signal.

That is, the controller 50b performs the operation for reading the medium image by scanning the medium image, while the drivers 110, 120, and 130 apply predetermined drive voltages (a reset pulse, a pre-charge pulse, and a reading pulse) to the photo-sensors 10 of the photo-sensor array 100 line by line sequentially.

(S103)

During the operation of reading the medium image, the controller 50b (operation control unit 51) monitors whether or not the operation for reading the medium image is completed.

(S104)

Even while the operation for reading the medium image is performed, the detection circuit 40b continues the operation for monitoring a change in the component of the signal obtained from the medium detection mechanism.

Then, if the medium gets separated from the detection surface before the operation for reading the medium image is completed, i.e., in the middle of performing the operation for reading the medium image, the detection circuit 40b detects a state where the medium is separated from the detection surface by a change in the component of the signal obtained from the medium detection mechanism, and outputs a separation detection signal to the controller 50b (operation control unit 51).

(S105)

The operation control unit 51 forcibly stops (suspends) the operation for reading the medium image by receiving the separation detection signal as a reading operation stop signal via the OR logic unit 52.

That is, the operation control unit 51 performs an operation for cutting off application of the drive voltages to the photo-sensors 10 of the photo-sensor array 100, by cutting off outputting of the control signals φtg, φbg, and φpg to the drivers 110, 120, and 130. Due to this, the image reading apparatus is shifted from the image reading state to the completing state, and set to the waiting state.

(S106)

In a case where the controller 50b (operation control unit 51) receives a reading operation stop signal (separation detection signal) in the middle of performing the operation for reading the medium image, the controller 50b drives the warning unit 60 to perform an operation for notifying the user that the medium is separated from the detection surface in the middle of the image reading operation and the image reading operation is stopped (suspended), by a sound, light, message display, etc.

Then, the detection circuit 40b continues the operation for monitoring a change in the signal component in accordance with that the medium is again placed on the detection surface in contact therewith.

(S107)

On the other hand, in a case where the image reading operation is completed normally without separation of the medium from the detection surface in the middle of the image reading operation (S103), the operation control unit 51 performs an operation for cutting off application of drive voltages to the photo-sensors 10 of the photo-sensor array 100 by cutting off outputting of control signals φtg, φbg, and φpg to the drivers 110, 120, and 130, in accordance with an operation completion signal generated inside the operation control unit 51 when the image reading operation is completed. As a result, the image reading apparatus 200b is shifted from the image reading state to the completing state, and is set to the waiting state.

Then, the detection circuit 40b continues the operation for monitoring a change in the signal component in accordance with that a medium is placed on the detection surface again in contact therewith.

(S108)

Then, the controller 50b performs predetermined image processing (for example, fingerprint collating, in a case where the image reading apparatus according to the present embodiment is applied to a fingerprint reading operation), based on the image data of the medium image obtained by the image reading operation.

The image reading apparatus according to the present embodiment may comprise the structure of the first embodiment in addition to the structure of the second embodiment. In this case, in the waiting state in step S101 of the flowchart of FIG. 17 where power supply to the image reading apparatus 200b is started and the detection circuit 40b monitors whether or not a medium is placed on the detection surface, electrical connection between the photo-sensor array and each driver may be cut off. And in a case where it is detected that a medium gets in contact with the detection surface, the photo-sensor and each driver may be electrically connected, and the image reading operation may be started in step S102. Further, when separation of the medium from the detection surface is detected in the middle of the operation for reading the medium image in step S104, or when the image reading operation is completed normally in step S107, electrical connection between the photo-sensor array and each driver may be cut off and the image reading apparatus may be set to the waiting state.

In any of the cases where the image reading operation is normally completed and where the image reading operation is forcibly stopped in the above-described flow, there is caused unevenness in effective voltages due to polarities of and timings to apply the drive voltages (bias voltages) to be applied to each gate electrode of the photo-sensors (double-gate photo-sensors). If a voltage inclined to a specific polarity is continued to be applied to the gate electrodes, there arises a problem that positive holes are trapped in the gate electrodes, thus the sensing characteristic of the photo-sensors and elemental characteristic will be deteriorated.

To overcome this problem, a step of applying a reverse-bias voltage to each gate electrode so as to cancel (offset) the effective voltage applied in the process cycle of the image reading operation, may be performed immediately after, for example, steps S105 and S107. According to this drive control method, it is possible to obtain a favorable read image by removing influences caused by unevenness in the effective voltages applied to the photo-sensors, and to prevent deterioration of the elemental characteristic.

A case where the operation for reading a medium image is performed in step S102 has been explained. However, in this step, not only the regular operation for reading the medium image, but also an operation for adjusting sensitivity of the image reading apparatus using a medium image (an operation for setting the optimum reading sensitivity) may be performed prior to the regular image reading operation. That is, in step S102, after the optimum reading sensitivity is set by performing an image reading operation for sensitivity adjusting purpose using a medium, the regular image reading operation may be successively performed.

As described above, according to the present embodiment, in a case where a medium placed on the detection surface is separated from the detection surface in the middle of performing the operation for reading the medium image, the image reading operation is stopped immediately. Therefore, it is possible to suppress wasteful continuation of the image reading operation and waste of processing time. Further, when the medium is placed on the detection surface again, it is possible to start the image reading operation immediately, because the image reading apparatus shifts to the waiting state soon after the image reading operation is stopped in order to continue the operation for monitoring whether the medium is in contact with the detection surface. Thus, it is possible to improve the convenience of the image reading apparatus when it is used.

Further, when the medium is separated from the detection surface, the driving of the image reading apparatus is stopped immediately. Therefore, it is possible to prevent external light from coming into the photo-sensors when they are driven, thus to suppress deterioration of the characteristic of the photo-sensors.

Furthermore, in a case where the medium is separated from the detection surface, it is possible to notify the user that the operation for reading the medium image is not performed properly (that a problem happens) by performing a predetermined warning operation, and to urge the user to place the medium on the detection surface again and execute the image reading operation. Therefore, it is possible to obtain a proper read image of the medium, and to perform preferable image processing based on this read image.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2002-75811 filed on Mar. 19, 2002 and Japanese Patent Application No. 2002-75937 filed on Mar. 19, 2002 and including specification, claims, drawings and summary. The disclosure of the above Japanese Patent Applications is incorporated herein by reference in its entirety.

INDUSTRIAL APPLICABILITY

This invention is being applicable to an image processing field.

The invention claimed is:

1. An image reading apparatus comprising:
a sensor array which is formed by arranging a plurality of sensors, and which comprises a detection surface on which a medium is placeable;
a drive controller for performing an image reading operation of supplying a predetermined drive control signal to each of the sensors of the sensor array, and reading an image pattern of the medium placed on the detection surface;
a detection circuit comprising a medium detector and a connection switching controller,
wherein the medium detector detects a placement state where the medium is placed on the detection surface,
wherein at least when the medium detector detects that the medium is placed on the detection surface, the connection switching controller establishes an electrical connection between one end of each of the sensors and the drive controller as well as an electrical connection between another end of each of the sensors and a ground potential, and
wherein at least when the medium detector detects that the medium is separated from the detection surface, the connection switching controller cuts off the electrical connection between the one end of each of the sensors and the drive controller as well as the electrical connection between said another end of each of the sensors and the ground potential; and
an operation controller which controls an operational state of the drive controller, at least in accordance with a detection result of the placement state of the medium by the medium detector.

2. The image reading apparatus according to claim 1, wherein in a waiting state, the connection switching controller cuts off an electrical connection between at least the sensor array, the drive controller and the ground potential.

3. The image reading apparatus according to claim 1, wherein the connection switching controller cuts off an electrical connection between the sensor array and the drive controller when the reading of the image pattern of the medium is completed by the image reading operation of the drive controller.

4. The image reading apparatus according to claim 1, wherein the drive controller includes a power supplier which supplies a predetermined drive voltage to the sensor array.

5. The image reading apparatus according to claim 1, wherein the connection switching controller includes a switching unit which is provided between the sensor array, the drive controller and the ground potential.

6. The image reading apparatus according to claim 5, wherein the operation controller supplies the switching unit with a switching control signal for cutting off an electrical connection between the sensor array, the drive controller and the ground potential, when the reading of the image pattern of the medium is completed by the image reading operation of the drive controller.

7. The image reading apparatus according to claim 5, wherein the medium detector supplies the switching unit with a switching control signal for controlling the switching unit in accordance with the detection result of the placement state of the medium.

8. The image reading apparatus according to claim 7, wherein the medium detector:
supplies the switching unit with a switching control signal for electrically connecting the sensor array to the drive controller and to the ground potential, when the medium detector detects that the medium is placed on the detection surface; and
supplies the switching unit with a switching control signal for cutting off an electrical connection between the sensor array, the drive controller and the ground potential, when the medium detector detects that the medium is separated from the detection surface.

9. The image reading apparatus according to claim 1, wherein the operation controller stops the image reading operation of the drive controller when the reading of the image pattern of the medium is completed by the image reading operation of the drive controller.

10. The image reading apparatus according to claim 9, wherein the operation controller stops the image reading operation of the drive controller by cutting off supply of a drive voltage to at least the drive controller.

11. The image reading apparatus according to claim 9, wherein the operation controller supplies each of the sensors of the sensor array whose image reading operation has been stopped, with a predetermined voltage for offsetting a drive voltage applied to said each sensor.

12. The image reading apparatus according to claim 1, wherein the operation controller:

controls the drive controller to start the image reading operation, when the medium detector detects that the medium is placed on the detection surface; and controls the drive controller to suspend the image reading operation and sets the drive controller to a waiting state, when the medium detector detects that the medium is separated from the detection surface while the image reading operation is being performed by the drive controller.

13. The image reading apparatus according to claim 12, wherein the operation controller controls the drive controller to suspend the image reading operation by cutting off supply of a drive voltage to at least the drive controller.

14. The image reading apparatus according to claim 12, wherein the operation controller supplies each of the sensors of the sensor array whose image reading operation has been suspended with a predetermined voltage for offsetting a drive voltage applied to said each sensor.

15. The image reading apparatus according to claim 1, further comprising a warning unit for notifying information on an operational state of the image reading apparatus, wherein the operation controller performs a predetermined warning operation using the warning unit when the medium detector detects that the medium is separated from the detection surface while the image reading operation is being performed by the drive controller.

16. The image reading apparatus according to claim 15, wherein the warning unit includes at least one of a display unit and a sound unit.

17. A drive control method for an image reading apparatus which comprises a sensor array that is formed by arranging a plurality of sensors, and that comprises a detection surface on which a medium is placeable, and a drive controller for supplying a predetermined drive control signal to the sensor array and reading an image pattern of the medium placed on the detection surface, the method comprising:

detecting a placement state where the medium is placed on the detection surface of the sensor array;

at least when it is detected that the medium is placed on the detection surface, electrically connecting one end of each of the sensors of the sensor array and the drive controller as well as electrically connecting another end of each of the sensors of the sensor array and a ground potential; and at least when it is detected that the medium is separated from the detection surface, cutting off the electrical connection between the one end of each of the sensors of the sensor array and the drive controller as well as the electrical connection between said another end of each of the sensors of the sensor array and the ground potential, and setting the image reading apparatus to a waiting state.

18. The drive control method according to claim 17, further comprising cutting off an electrical connection between the sensor array and the drive controller, when it is detected that the medium is separated from the detection surface.

19. The drive control method according to claim 17, further comprising starting an image reading operation for reading the image pattern of the medium, when it is detected that the medium is placed on the detection surface.

20. The drive control method according to claim 19, further comprising:

stopping the image reading operation and setting the image reading apparatus to the waiting state, when the reading of the image pattern is completed; and supplying each of the sensors included in the sensor array whose image reading operation is stopped with a predetermined voltage for offsetting a drive voltage applied to said each sensor.

21. The drive control method according to claim 19, further comprising suspending the image reading operation and setting the image reading apparatus to the waiting state, when it is detected that the medium is separated from the detection surface while the image reading operation is being performed.

22. The drive control method according to claim 21, wherein the suspending of the image reading operation comprises performing a predetermined warning operation.

23. The drive control method according to claim 21, wherein the suspending of the image reading operation comprises supplying each of the sensors included in the sensor array with a predetermined voltage for offsetting a drive voltage applied to said each sensor.

24. The image reading apparatus according to claim 1, wherein each of the sensors:

includes a source electrode and a drain electrode which are formed so as to sandwich a channel area made of a semiconductor layer therebetween, and a first gate electrode and a second gate electrode which are formed at least above and below the channel area via insulation layers respectively;

has a structure in which one of the first gate electrode and the second gate electrode is provided on a side of the detection surface, and charges corresponding to an amount of light irradiated from the side of the detection surface are generated and stored in the channel area during a predetermined charge storing period that is set by supplying the drive control signal to the first gate electrode and the second gate electrode from the drive controller; and reads the image pattern of the medium placed on the detection surface by a voltage which is output in accordance with an amount of the charges stored.

25. A drive control method for an image reading apparatus which comprises a sensor array that is formed by arranging a plurality of sensors, and that comprises a detection surface on which a medium is placeable, and a drive controller for supplying a predetermined drive control signal to the sensor array and reading an image pattern of the medium placed on the detection surface, the method comprising:

detecting a placement state where the medium is placed on the detection surface of the sensor array;

at least when it is detected that the medium is placed on the detection surface, electrically connecting one end of each of the sensors of the sensor array and the drive controller as well as electrically connecting another end of each of the sensors of the sensor array and a ground potential; and at least when it is detected that the medium is separated from the detection surface, cutting off the electrical connection between the one end of each of the sensors of the sensor array and the drive controller as well as the electrical connection between said another end of each of the sensors of the sensor array and the ground potential, and setting the image reading apparatus to a waiting state.

26. The drive control method according to claim 25, further comprising cutting off an electrical connection between the sensor array and the drive controller, when it is detected that the medium is separated from the detection surface.

27. The drive control method according to claim 25, further comprising starting an image reading operation for reading the image pattern of the medium, when it is detected that the medium is placed on the detection surface.

28. The drive control method according to claim 27, further comprising:

stopping the image reading operation and setting the image reading apparatus to the waiting state, when the reading of the image pattern is completed; and supplying each of the sensors included in the sensor array whose image reading operation is stopped with a predetermined voltage for offsetting a drive voltage applied to said each sensor.

29. The drive control method according to claim 27, further comprising suspending the image reading operation and setting the image reading apparatus to the waiting state, when it is detected that the medium is separated from the detection surface while the image reading operation is being performed.

30. The drive control method according to claim 29, wherein the suspending of the image reading operation comprises performing a predetermined warning operation.

31. The drive control method according to claim 29, wherein the suspending of the image reading operation comprises supplying each of the sensors included in the sensor array with a predetermined voltage for offsetting a drive voltage applied to said each sensor.

* * * * *

UNITED STATES PATENT AND TRADEMARK OFFICE
CERTIFICATE OF CORRECTION

PATENT NO. : 7,612,354 B2
APPLICATION NO. : 10/508368
DATED : November 3, 2009
INVENTOR(S) : Yasushi Mizutani It is certified that error appears in the above-identified patent and that said Letters Patent is hereby corrected as shown below:

Col. 24-26, lines 39-12;

In the Claims:

Delete Claims 25 to Claims 31.

Add new claims 25-31, as follows:

--25. The image reading apparatus according to claim 1, where in the medium detector comprises:

an electrode layer which is provided on the detection surface; and a capacitance change detector which detects a change in a capacitance of the electrode layer.

26. The image reading apparatus according to claim 25, wherein the medium detector determines that the medium is placed on the detection surface when the capacitance change detector detects an increase in the capacitance of the electrode layer.

27. The image reading apparatus according to claim 25, wherein the medium detector determines that the medium is separated from the detection surface when the capacitance change detector detects a reduction in the capacitance of the electrode layer.

28. The image reading apparatus according to claim 1, wherein the medium detector comprise;

two adjacent electrode layers which are provided on the detection surface with a predetermined interval therebetween: and a resistance change detector for detecting a change in an electrical resistance between the two Signed and Sealed this
Twenty-ninth Day of March, 2011

David J. Kappos
*Director of the United States Patent and Trademark Office* adjacent electrode layers.

29. The image reading apparatus according to claim 1, wherein the medium detector comprises a switching unit which is intermittently switched on in accordance with a contact pressure of the medium toward the detection surface.

30. The image reading apparatus according to claim 1, wherein the medium detector comprises:

an electrode layer which is provided on the detection surface;

a conductive material which is provided at one of along a circumference of the electrode layer and at a given position on the circumference;

an insulator which electrically insulates the electrode layer and the conductive material; and a resistance change detector which detects a change in an electrical resistance between the electrode layer and the conductive material.

31. The image reading apparatus according to claim 30, wherein the conductive material is a metal case for protecting the detection surface.--